(12) United States Patent
Woulfe et al.

(10) Patent No.: US 11,288,592 B2
(45) Date of Patent: Mar. 29, 2022

(54) BUG CATEGORIZATION AND TEAM BOUNDARY INFERENCE VIA AUTOMATED BUG DETECTION

(71) Applicant: MICROSOFT TECHNOLOGY LICENSING, LLC, Redmond, WA (US)

(72) Inventors: Muiris Woulfe, Dublin (IE); Poornima Muthukumar, Seattle, WA (US); Yuanyuan Dong, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 746 days.

(21) Appl. No.: 15/469,414

(22) Filed: Mar. 24, 2017

(65) Prior Publication Data
US 2018/0276562 A1 Sep. 27, 2018

(51) Int. Cl.
G06N 20/00 (2019.01)
G06F 11/36 (2006.01)
G06N 3/04 (2006.01)

(52) U.S. Cl.
CPC ......... *G06N 20/00* (2019.01); *G06F 11/3668* (2013.01); *G06N 3/0445* (2013.01)

(58) Field of Classification Search
CPC .. G06F 11/301; G06F 11/3072; G06F 21/563; G06F 11/3624; G06F 17/00; G06F 17/60; G06F 17/30
USPC ......................................................... 706/48
See application file for complete search history.

(56) References Cited

U.S. PATENT DOCUMENTS

| 7,672,811 | B2 | 3/2010 | Xiao et al. |
| 8,069,374 | B2 * | 11/2011 | Panigrahy ........... G06F 11/0715 |
| | | | 714/38.1 |
| 8,190,468 | B1 | 5/2012 | Drew et al. |
| 8,311,806 | B2 | 11/2012 | Bonnet et al. |
| 8,381,190 | B2 | 2/2013 | John et al. |
| 8,386,854 | B2 | 2/2013 | Fernandess et al. |
| 8,589,882 | B2 | 11/2013 | Shochat et al. |

(Continued)

FOREIGN PATENT DOCUMENTS

| CN | 105446734 A | 3/2016 |
| WO | 2015065367 A1 | 5/2015 |

OTHER PUBLICATIONS

'Bug Classification: Feature Extraction and Comparison of Event Model using Naïve Bayes Approach': Dommati, 2012, International Conference on Recent Trends in Computer and Information Engineering (ICRTCIE'2012).*

(Continued)

*Primary Examiner* — Li B. Zhen
*Assistant Examiner* — Peter D Coughlan
(74) *Attorney, Agent, or Firm* — Rainier Patents, P.S.

(57) ABSTRACT

A machine learning model can be trained to infer the probability of the presence of categories of a software bug in a source code file. A bug tracker can provide information concerning the category to which a software bug belongs. The bug data supplied to a machine learning model for inferring the presence of particular categories of bugs can be filtered to exclude a specified category or categories of bugs. Information including but not limited to organizational boundaries can be inferred from the category of bugs present in a body of source code. The inferred organization boundaries can be used to generate team-specific machine learning models.

20 Claims, 15 Drawing Sheets

(56) References Cited

U.S. PATENT DOCUMENTS

| | | | |
|---|---|---|---|
| 8,750,489 B2 | 6/2014 | Park | |
| 8,850,272 B2 | 9/2014 | Pasala et al. | |
| 8,924,938 B2* | 12/2014 | Chang | G06F 11/3688 717/126 |
| 9,043,759 B1 | 5/2015 | Lininger | |
| 9,183,123 B2 | 11/2015 | Spektor et al. | |
| 9,201,646 B2 | 12/2015 | Balachandran | |
| 9,244,510 B1 | 1/2016 | Conrad et al. | |
| 9,256,513 B2 | 2/2016 | Chen | |
| 9,305,279 B1 | 4/2016 | Menzel | |
| 9,378,015 B2 | 6/2016 | Nagappan et al. | |
| 9,389,984 B2 | 7/2016 | Chockler et al. | |
| 9,471,470 B2 | 10/2016 | Prasad et al. | |
| 9,626,283 B1* | 4/2017 | Zlatnik | G06Q 10/06 |
| 9,639,353 B1 | 5/2017 | Henriksen et al. | |
| 9,733,933 B1 | 8/2017 | Arquero et al. | |
| 9,898,387 B2 | 2/2018 | Rodmell | |
| 10,175,979 B1* | 1/2019 | Elwell | G06F 8/71 |
| 2003/0084063 A1* | 5/2003 | DelMonaco | G06F 8/70 |
| 2004/0117761 A1 | 6/2004 | Andrews et al. | |
| 2006/0041864 A1 | 2/2006 | Holloway et al. | |
| 2006/0156286 A1 | 7/2006 | Morgan et al. | |
| 2007/0028219 A1 | 2/2007 | Miller et al. | |
| 2007/0074149 A1* | 3/2007 | Ognev | G06F 11/366 717/101 |
| 2008/0228549 A1 | 9/2008 | Harrison | |
| 2009/0182757 A1 | 7/2009 | Lotlikar et al. | |
| 2009/0182758 A1* | 7/2009 | Lotlikar | G06F 16/24578 |
| 2009/0319995 A1* | 12/2009 | Gawor | G06F 8/33 717/125 |
| 2010/0058294 A1 | 3/2010 | Best et al. | |
| 2011/0154109 A1 | 6/2011 | Levine et al. | |
| 2011/0314450 A1* | 12/2011 | Shochat | G06Q 10/06 717/124 |
| 2012/0204068 A1* | 8/2012 | Ye | G06F 11/0709 714/57 |
| 2012/0323853 A1* | 12/2012 | Fries | G06F 11/3072 707/649 |
| 2013/0007700 A1 | 1/2013 | Villar et al. | |
| 2013/0014084 A1* | 1/2013 | Sahibzada | G06F 11/368 717/124 |
| 2013/0311968 A1* | 11/2013 | Sharma | G06F 11/3692 717/101 |
| 2013/0340076 A1* | 12/2013 | Cecchetti | G06F 21/6218 726/23 |
| 2014/0033174 A1 | 1/2014 | Farchi et al. | |
| 2014/0053135 A1* | 2/2014 | Bird | G06F 8/71 717/124 |
| 2014/0079297 A1 | 3/2014 | Tadayon et al. | |
| 2014/0136277 A1 | 5/2014 | Bassin et al. | |
| 2014/0149435 A1* | 5/2014 | Sisman | G06F 11/362 707/751 |
| 2014/0172514 A1 | 6/2014 | Schumann et al. | |
| 2014/0289617 A1* | 9/2014 | Rajagopalan | G06F 40/166 715/256 |
| 2015/0019564 A1* | 1/2015 | Higginson | H04L 43/04 707/748 |
| 2015/0033202 A1 | 1/2015 | Wilson et al. | |
| 2015/0052089 A1 | 2/2015 | Kozloski et al. | |
| 2015/0058826 A1 | 2/2015 | Hu et al. | |
| 2015/0067861 A1 | 3/2015 | Foley et al. | |
| 2015/0082277 A1* | 3/2015 | Champlin-Scharff | G06F 11/368 717/120 |
| 2015/0089481 A1 | 3/2015 | Pasala et al. | |
| 2015/0154020 A1* | 6/2015 | Lior | G06F 8/73 717/122 |
| 2015/0161030 A1 | 6/2015 | Wu et al. | |
| 2015/0269060 A1 | 9/2015 | Rodmell | |
| 2015/0309790 A1* | 10/2015 | Henriksen | G06F 8/43 717/121 |
| 2015/0363294 A1 | 12/2015 | Carback et al. | |
| 2016/0042275 A1* | 2/2016 | Dettman | G06F 11/366 706/46 |
| 2016/0239402 A1 | 8/2016 | Zieder et al. | |
| 2016/0274994 A1 | 9/2016 | Nikam et al. | |
| 2016/0378618 A1 | 12/2016 | Cmielowski et al. | |
| 2017/0060578 A1 | 3/2017 | Shukla et al. | |
| 2017/0075790 A1 | 3/2017 | Macleod et al. | |
| 2017/0091078 A1 | 3/2017 | Atyam et al. | |
| 2017/0147955 A1 | 5/2017 | Ezry et al. | |

OTHER PUBLICATIONS

'Detect Related Bugs from Source Code Using Bug Information': Wang, 2010, IEEE, 0730-3157, pp. 228-237.*

'Programmer-based Fault Prediction': Ostrand, 2010, ACM, PROMISE2010, Sep. 12-13, 2010. Timisoara, Romania.*

'AUSUM: Approach for Unsupervised Bug Report SUMmarization': Mani, 2012, ACM, SIGSOFT'12/FSE-20, Nov. 11-16, 2012, Cary, North Carolina, USA.*

'Finding Bugs in Source Code Using Commonly Available Development Metadata': Cook, 2015, 8th Workshop on Cyber Security.*

"Non Final Office Action Issued in U.S. Appl. No. 15/362,744", dated May 15, 2019, 24 Pages.

"Non Final Office Action Issued in U.S. Appl. No. 15/469,396", dated May 16, 2019, 15 Pages.

Maheedharan, Vimal, "Continuous Integration Testing Using Selenium", https://www.cabotsolutions.com/2016/12/continuous-integration-testing-using-selenium/, Published on: Dec. 28, 2016, 17 pages.

Bajwa, et al., "Unintentional bugs to vulnerability mapping in Android applications", In Proceedings of IEEE International Conference on Intelligence and Security Informatics, May 27, 2015, 2 pages.

Wang, et al., "Detect Related Bugs from Source Code Using Bug Information", In Proceedings of IEEE 34th Annual Computer Software and Applications Conference, Jul. 19, 2010, pp. 228-237.

U.S. Appl. No. 15/362,744, Woulfe, et al., "Source Code Bug Prediction", filed Nov. 28, 2016.

"Non Final Office Action Issued in U.S. Appl. No. 15/469,423", dated Mar. 22, 2019, 08 Pages.

"Non Final Office Action Issued in U.S. Appl. No. 15/469,431", dated Aug. 9, 2019, 22 Pages.

Dommati, et al., "Bug Classification: Feature Extraction and Comparison of Event Model using Naive Bayes Approach", International Conference on Recent Trends in Computer and Information Engineering, Apr. 13, 2012, pp. 8-12.

"Definition of Risk Factor", Retrieved From: https://www.merriam-webster.com/dictionary/risk%20factor, Retrieved Date: Nov. 13, 2018, 1 Page.

"Non Final Office Action Issued in U.S. Appl. No. 15/469,423", dated Apr. 27, 2018, 24 Pages.

"Non Final Office Action Issued in U.S. Appl. No. 15/469,431", dated Apr. 9, 2018, 20 Pages.

Cook, et al., "Finding Bugs in Source Code Using Commonly Available Development Metadata", In Proceedings of the 8th Workshop on Cyber Security Experimentation and Test, Aug. 10, 2015, 8 Pages.

Gong, et al., "BugMap: A Topographic Map of Bugs", In Proceedings of the 9th Joint Meeting on Foundations of Software Engineering, Aug. 26, 2013, pp. 647-650.

Hardesty, Larry, "Recognizing Correct Code", Retrieved From: http://news.mit.edu/2016/faster-automatic-bug-repair-code-errors-0129, Jan. 29, 2016, 3 Pages.

Khanduja, Jaideep, "How to Predict the Number of Bugs in the Next Code of a Programmer", Retrieved From: https://itknowledgeexchange.techtarget.com/quality-assurance/how-to-predict-the-number-of-bugs-in-the-next-code-of-a-programmer/, Oct. 19, 2009, 6 Pages.

Kim, et al., "Classifying Software Changes: Clean or Buggy", In Journal of Transactions on Software Engineering, vol. 34, Issue 2, Mar. 31, 2008, pp. 1-41.

Kim, et al., "Memories of Bug Fixes", In Proceedings of the 14th ACM SIGSOFT International Symposium on Foundations of Software Engineering, Nov. 11, 2006, 11 Pages.

(56) References Cited

OTHER PUBLICATIONS

Lee, et al., "Micro Interaction Metrics for Defect Prediction", In Proceedings of the 19th ACM SIGSOFT symposium and the 13th European conference on Foundations of Software Engineering, Sep. 9, 2011, pp. 311-321.

Lewis, et al., "Bug Prediction at Google", Retrieved From: http://google-engtools.blogspot.in/2011/12/bug-prediction-at-google.html, Dec. 15, 2011, 15 Pages.

Madhavan, et al., "Predicting Buggy Changes Inside an Integrated Development Environment", In Proceedings of the OOPSLA Workshop on Eclipse Technology Exchange, Oct. 21, 2007, pp. 36-40.

Ostrand, et al., "Programmer-Based Fault Prediction", In Proceedings of the 6th International Conference on Predictive Models in Software Engineering, Sep. 13, 2010, pp. 1-10.

Zhang, et al., "Mining Individual Performance Indicators in Collaborative Development Using Software Repositories", In Proceedings of the 15th Asia-Pacific Software Engineering Conference, Dec. 5, 2008, pp. 247-254.

"Final Office Action Issued in U.S. Appl. No. 15/469,396", dated Nov. 1, 2018, 12 Pages.

"Non Final Office Action Issued in U.S. Appl. No. 15/469,396", dated Jun. 4, 2018, 16 Pages.

"Final Office Action Issued in U.S. Appl. No. 15/469,423", dated Oct. 5, 2018, 25 Pages.

"Final Office Action Issued in U.S. Appl. No. 15/469,431", dated Nov. 19, 2018, 24 Pages.

"Advisory Action Issued in U.S. Appl. No. 15/469,423", dated Jan. 7, 2019, 3 Pages.

U.S. Appl. No. 15/469,396, Woulfe, et al., "Enhancing Software Development Using Bug Data", filed Mar. 24, 2017.

U.S. Appl. No. 15/469,423, Woulfe, et al., "Improving Engineering System Robustness Using Bug Data", filed Mar. 24, 2017.

U.S. Appl. No. 15/469,431, Woulfe, et al., "Facilitating Organizational Management Using Bug Data", filed Mar. 24, 2017.

"Probability vs Confidence", Retrieved from: https://math.stackexchange.com/questions/1966211/probability-vs-confidence/1967239, 2016, 4 Pages.

"Final Office Action Issued in U.S. Appl. No. 15/362,744", dated Oct. 17, 2019, 25 Pages.

Annis, Charles, "Frequentists and Bayesians", Retreived from: http://www.statisticalengineering.com/frequentists_and_bayesians.htm, 2014, 2 Pages.

Meyniel, et al., "Confidence as Baysian Probability: from neural origins to behavior", In Neuron vol. 88, Issue 1, Oct. 7, 2015, pp. 78-92.

Strauss, et al., "Classical confidence intervals and Bayesian probability estimates for ends of local taxon ranges", Mathematical Geology, vol. 21, No. 4, May 1989, pp. 411-427.

"Final Office Action Issued in U.S. Appl. No. 15/469,423", dated Oct. 3, 2019, 30 Pages.

"Non Final Office Action Issued in U.S. Appl. No. 15/362,744", dated Apr. 29, 2020, 30 Pages.

Giger, et al., "Method-Level Bug Prediction", In Proceedings of the ACM-IEEE International Symposium on Empirical Software Engineering and Measurement, Sep. 19, 2012, pp. 171-180.

"Final Office Action Issued in U.S. Appl. No. 15/362,744", dated Nov. 12, 2020, 35 Pages.

\* cited by examiner

Mined Data 308

```
FALSE    public static class Fibonacci
FALSE    {
FALSE      public static int Fibonacci ( int n)
TRUE      {
FALSE        int [ ] fib = new int [n];
FALSE        fib[0] = 0;
FALSE        fib[1] = 1;
FALSE        for (int i=2; i<= n; i++)
FALSE        {
FALSE          fib[i] = fib[i – 1];
FALSE        }
FALSE        return fib[n];
FALSE      }
FALSE    }
```

Training Data 502

⇨

| | | |
|---|---|---|
| FALSE | ClassDeclaration/ PublicKeyword/ StaticKeyword/ ClassKeyword/ Identifier Token/ | EOL |
| FALSE | OpenBraceToken/ EOL | EOL |
| FALSE | MethodDeclaration/ PublicKeyword/ StaticKeyword/ PredefinedType/ IntKeyword/ IdentifierToken/ Parameter List/ OpenParenToken/ Parameter / PredefinedType/ IntKeyword/ IdentifierToken/ CloseParenToken/ EOL | EOL |
| FALSE | Block/ OpenBrace Token / EOL | EOL |
| TRUE | LocalDeclarationStatement/ VariableDeclaration/ PredefinedType/IntKeyword/ ArrayType/ PredefiedType/IntKeyword/ ArrayRankSpecifier/ EOL | EOL |
| FALSE | ExpressionStatement/ SimpleAssignmentExpression/ ElementAccessExpression/ IdentifierName/ Identifier Token/ BracketedArgumentList/ OpenBracketToken/ Argument/ NumericLiteralExpression/ NumericLiteralToken/ EOL | EOL |
| FALSE | ExpressionStatement /SimpleAssignmentExpression/ ElementAccessExpression/IdentifierName/Identifier Token/ BracketedArgumentList/ OpenBracketToken/ Argument/ NumericLiteralExpression/ NumericLiteralToken / NumericLiteralExpression/ NumericLiteralToken/ EOL | EOL |
| FALSE | ForStatement/ ForKeyword/ OpenParenToken/ VariableDeclaration/EOL | EOL |
| FALSE | Block/ OpenBraceToken/EOL | EOL |
| FALSE | ExpressionStatement/ SimpleAssignmentExpression/ElementAccessExpression/ Identifier/EOL | EOL |
| FALSE | CloseBraceToken/ EOL | EOL |
| FALSE | ReturnStatement/ ReturnKeyword/ ElementAccessExpression/ Identifier Name/EOL | EOL |
| FALSE | CloseBraceToken/ EOL | EOL |
| FALSE | CloseBraceToken/ EOL | EOL |

```
public static class Fibonacci
{
    public static int Fibonacci(double n)
    {
        int[] fib = new int[n];
        fib[0] = 0;
        fib[1] = 1;
        for (float i = 2; i <= n; i++)
        {
            fib[i] = fib[i - 1];
        }
        return fib[n];
    }
}
```

FIG. 10A

```
                public static class Fibonacci
                {
1043
     12%   A        public static int Fibonacci(double n)
                    {
1045
     94    A            int[] fib = new int[n];
                        fib[0] = 0;
                 1050
                        fib[1] = 1;
1047
     44    A            for (float i = 2; i <= n; i++)
                        {
1049
     95    A                fib[i] = fib[i - 1];
                        }
                        return fib[n];
                    }
                }
```

*FIG. 10E*

BUG CATEGORIZATION AND TEAM BOUNDARY INFERENCE VIA AUTOMATED BUG DETECTION

CROSS-REFERENCE TO RELATED APPLICATIONS

The application is related in subject matter to co-pending U.S. patent application Ser. No. 15/469,396 entitled "ENHANCING SOFTWARE DEVELOPMENT USING BUG DATA", filed on Mar. 24, 2017. The application is related in subject matter to co-pending U.S. patent application Ser. No. 15/469,423 entitled "IMPROVING ENGINEERING SYSTEM ROBUSTNESS USING BUG DATA", filed on Mar. 24, 2017. The application is related in subject matter to co-pending U.S. patent application Ser. No. 15/469,431 entitled "FACILITATING ORGANIZATIONAL MANAGEMENT USING BUG DATA", filed on Mar. 24, 2017. This application is related in subject matter to co-pending U.S. patent application Ser. No. 15/362,744 entitled "SOURCE CODE BUG PREDICTION" filed on Nov. 28, 2016.

BACKGROUND

A software bug is a mistake in a computer program that causes the program to produce incorrect or unexpected results or to otherwise behave in a way that was not intended. Typically, bugs arise from human error. Mistakes can be made in syntax, semantics or in the logic in source code. Bugs can also arise as a result of a system design flaw. Sometimes, bugs arise elsewhere, such as for example, in hardware components. As will be appreciated, a great deal of effort is typically expended in finding and correcting bugs. In the process of finding and correcting bugs, a great deal of useful information can be generated.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A machine learning model can be trained to infer the probability of the presence of categories of a software bug in a source code file. The machine learning model can be trained during a training phase that mines source code repositories for source code files having source code statements with and without categories of software bugs. A bug tracker can provide information concerning the category to which a software bug belongs. The bug data supplied to a machine learning model for inferring the presence of particular categories of bugs can be filtered to exclude a specified category or categories of bugs.

Features associated with the syntactic structure or context of the source code file can be extracted for analysis in order to generate feature vectors that can be used to train the machine learning model to infer the presence of categories of bugs. The feature vectors may represent syntactic information from each line of source code, from each method in a source code file, for each interface in a source code file, for each class of a source code file and/or for any combination thereof. The feature vectors can be used to train a machine learning model to determine the likelihood that a category of bug is present in a target source code file. Information including but not limited to organizational boundaries can be inferred from the category of bugs present in a body of source code. The inferred organization boundaries can be used to generate team-specific machine learning models and/or analyses.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIG. 5 is an example illustrating operations of the code analysis engine on a program in accordance with aspects of the subject matter disclosed herein;

FIGS. 10A-10E are illustrations of examples of the output generated by a virtualization engine in accordance with aspects of the subject matter disclosed herein.

DETAILED DESCRIPTION

Overview

Figure 1A:
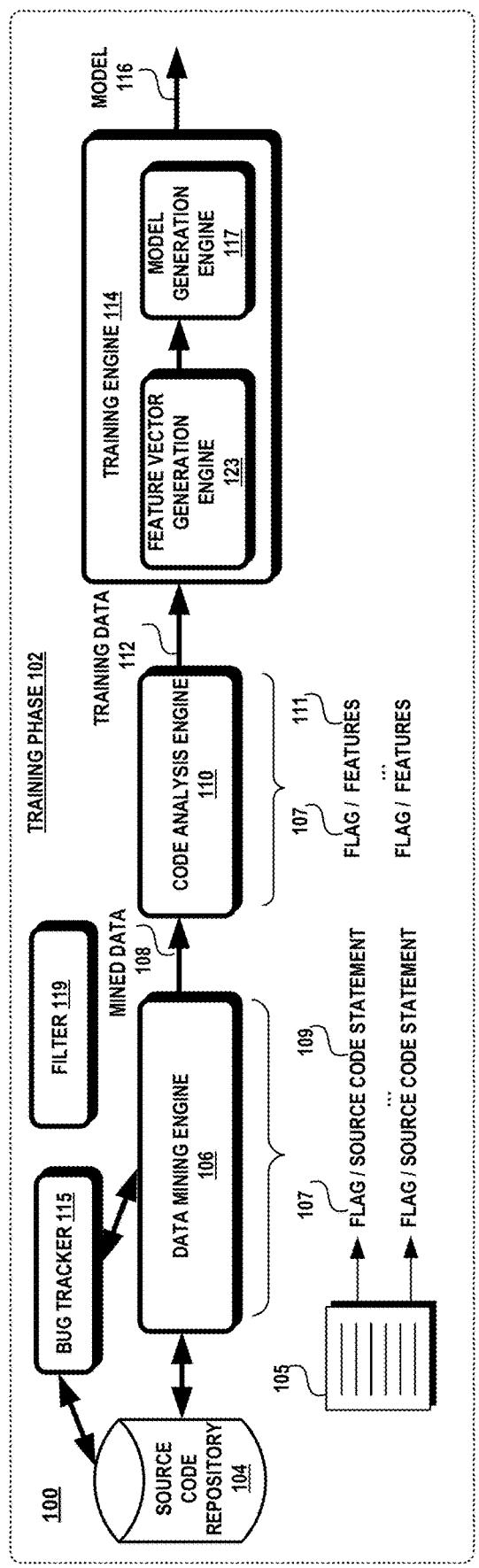
FIG. 1A is a block diagram illustrating an example of a system for training a machine learning model for inferring the presence of categories of software bugs in source code in accordance with aspects of the subject matter disclosed herein.

In accordance with aspects of the subject matter disclosed herein a mechanism for inferring the presence of categories of software bugs in a source code file is described. The mechanism can analyze one or more source code files to extract features that represent patterns indicative of a category of software bug. A bug tracker can be queried to ascertain a category of bug to which a particular bug belongs. The features selected can capture the context in which a category of software bug exists and does not exist in order to train a machine learning model to learn the patterns that identify a category of software bug. The mechanism described herein can utilize a context that is based on the syntactical structure of the source code. Hence, the machine learning model can learn the existence of a category of software bug from the context where the category of software bug exists and does not exist. Supervised or unsupervised learning techniques can be utilized.

The subject matter disclosed herein can utilize different techniques for extracting features of source code with a category of software bugs and features of source code that do not have that category of software bugs. In accordance with some aspects of the subject matter disclosed herein, each element in a line of source code can be converted into a token that represents the element. An element is an aspect of the code that is considered by the processor and can include but is not limited to characters, chunks of characters, space-delimited parts of the code, lines, metrics and/or abstract representations of code such as syntax tokens.

The line of source code can be represented as a sequence of tokens. The sequence of tokens can be grouped into a window or group that includes sequences of tokens in an aggregated collection of contiguous source code statements. The sequences in a window can be transformed into a binary representation which forms a feature vector that trains a machine learning model, such as a long short-term model (LSTM). LSTM is a recurrent neural network (RNN) architecture that is well-suited to learn from experience to classify, process and predict time series when there are time lags of unknown size and bound between significant events.

In accordance with some aspects of the subject matter disclosed herein, a source code file can be partially tokenized with each line of source code including a combination of tokens and source code. Each line of source code can be analyzed on a character-by-character or chunk-by-chunk basis to identify characters or chunks that are associated with and are not associated with a category of software bug. A chunk, as used herein, has a predetermined number of characters. Contiguous chunks of source code can be grouped into a window which can be converted into a binary representation that forms feature vectors that train a machine learning model, such as but not limited to a recurrent neural network (RNN).

In accordance with other aspects of the subject matter disclosed herein, metrics representing a measurement of syntactical elements of a source code file can be collected. The metrics can include the number of variables, the number of mathematical operations, the number of a particular data type referenced, the number of loop constructs, the usage of a particular method, the usage of a particular data type and/or the complexity of the block of code such as, for example, computed by $O(n)$, $O(n^2)$, $O(n^3)$, etc. Computational complexity is a way of classifying computational problems according to their inherent difficulty. $O(n)$ means iteration over all n objects under consideration a single time as in, for example, a standard loop. $O(n^2)$ means iteration over all n objects for each iteration of the $O(n)$ loop. $O(n^3)$ means iteration over all n objects for each iteration of the $O(n^2)$ loop.

Metrics can be collected for each line of source code, for each method in a source code file, for each class in a source code file, and/or in other groupings. The metrics can be converted into a binary representation that forms feature vectors which can be used to train a machine learning model such as but not limited to an artificial neural network (ANN).

The feature vectors can be constructed from source code files having a category of software bug and source code files without a software bug of that category. The feature vectors can be split into data that is used to train the machine learning model and data that is used to test the machine learning model. The model can be used to predict the probability of the presence of a category of software bug in a source code file.

A visualization technique can be used to display the probabilistic output from the machine learning model. A visualization engine can be utilized to display each line, method, and/or class of a target source code file with a corresponding probability of a category of software bug. The probability can be displayed as a numeric value, as an icon, by highlighting portions of the source code in various colors or shading the portion of the source code in a particular style and/or in other ways as known in the art. Probabilities can be displayed when the probability exceeds a threshold. However, the subject matter disclosed herein is not constrained to any particular visualization technique, style or format and other formats, styles and techniques can be utilized as desired.

The detection of any category of software bug differs from performing type checking which uses the syntax of the programming language to find syntax errors. The software bugs referred to herein can include semantic and logic errors. Semantic errors occur when the syntax of the source code is correct but the semantics or meaning of a portion of the source code is not what is intended. A logic error occurs when the syntax of the source code is correct but the flow of instructions does not perform or produce an intended result. Hence, a software bug can affect the behavior of the source code and/or can result in an unintended state and undesired behavior.

Bug Categorization and Team Boundary Inference via Automated Bug Detection

FIG. 1A illustrates an example of a system 100 for training a machine learning model to categorize source code bugs in accordance with aspects of the subject matter disclosed herein. A system such as system 100 can execute a training phase 102 that generates a model 116 that can predict the probability of the presence of a type or category of software bug in a source code file.

The system 100 can include a source code repository 104 coupled to a data mining engine 106. Source code repository 104 can be coupled to a bug tracker such as bug tracker 115. Contemplated bug trackers include any mechanism that provides bug information including the type or category of bug tracked where the information provided by the bug tracker can be connected back to source code changes. A bug tracker can keep track of reported software bugs in software development projects. A bug tracker can include a dataset (not shown) that records facts about known bugs. Facts can include the type or category of a bug, the time a bug was reported, its severity, erroneous program behavior associated with the bug, instructions on how to reproduce the bug and so on. For each bug in the training and testing data, the data mining engine 106 can query the bug tracker 115 for the type of the bug.

The category of bug received from the bug tracker can be encoded. A vector of a length equal to the size of the set of allowed bugs can be employed with one-hot encoding used to select the vector element corresponding to the particular bug type. "One-hot" refers to a group of bits among which the legal combinations of values are only those with a single high (i.e., 1 or "on") bit and all the others low (i.e., 0 or "off"). "One-cold" refers to an implementation in which all bits are set to "1" except for one which is set to "0". Other encoding forms are also contemplated. For example, if one bug belongs to more than one category, more than one element can be "hot" at a particular point in time.

The data can be fed into any machine learning model. During an execution of the model, the probability of each bug category appearing in a line of source code can be outputted. The probability information can be displayed in a user interface. The probability information can be converted to a true or false value instead of being displayed as a percentage, can be displayed as a bar chart of the probabilities of a bug belonging to each possible category, can be displayed solely as the probability of the most probable category, and so on.

If the model has determined that no bug exists in the line of source code, all of the bug category vector elements can remain empty ("cold" or set to "0"). In accordance with some aspects of the subject matter disclosed herein, if, instead of using an explicit no-bug category, all of the bug category vector elements remain empty, the model can be simplified. Simplification of the model can improve performance during training. Simplification of the model can improve performance during evaluation (testing) of the model. Convergence (reaching a model with a desired degree of accuracy) can be improved.

Different categories of bugs can be labeled differently. Contemplated types or categories of bugs include but are not limited to an accessibility bug, a globalization bug, a localization bug, a security bug, a performance bug, a bug that causes a crash, and so on. An accessibility bug refers to a bug that is associated with users with particular needs such as users who are sight-impaired, etc. A globalization bug refers to a bug that causes the system/software to fail to perform properly in all locales or cultures or does not function properly with all types of international inputs. A localization bug refers to a bug that exists in the locale/cultures which is not the locale/culture used to develop the system/software. For example, for software that is initially developed for English speaking countries, the German version of the software may have text overflow in a User Interface because the German translation of strings are often much longer than English. A security bug refers to a bug that can be exploited to gain unauthorized access or privileges to a system. A performance bug is a bug that impacts how well (e.g., how fast, how correctly, how completely, etc.) the program executes. Additional types of bugs include but are not limited to bugs related to portability, functional suitability, reliability, compatibility with different hardware and so on. Each type of bug can be associated with a label. For example, an accessibility bug can be labeled "A", a globalization bug labeled "G", etc. It will be appreciated that the labels are examples only and any labels can be chosen.

In accordance with some aspects of the subject matter disclosed herein, instead of labeling categories of bugs, the machine learning system can group the bugs and the bug fixes within the source data through the process of unsupervised learning, clustering and/or classification. Unsupervised learning refers to using unlabeled input and allowing the machine learning component to assign labels to the data. This approach can group bugs having similar characteristics together. For example, using a model created using source code tokens, bugs can be grouped based on inferred characteristics such as but not limited to token count or the presence or absence of a token type. Using other types of models, such as those that combine tokens and source code, may result in grouping bugs based on the use of particular methods. The categories of bugs inferred by the machine learning system can be different than the labeled category of bugs because the inferred categories are related to the code changes instead of to the nature of the observed bug. More detailed classifications can be possible using inferred labels, enabling filtration to be more precise. Classifications will not have meaningful labels associated with them, so automatically generated labels can be applied to classifications. Labels such as the predominant token type associated with a bug and/or a numerical identifier among others can be applied. Classifications can be manually labeled after generation. Classifications can be made less detailed by changing model parameters. The possibility of misclassification of bugs within the bug tracker can be avoided.

A combination of categories from the bug tracker and inferred categories can be used. The inferred categories and the categories labeled using the bug tracker categories can be provided to the model to be trained. One model outputting both bug classification schemes can result. Two or more models are possible. One model can have one or more categories switched off in its output. The models can be run separately and results can be layered in the presentation to the user (e.g., through a user interface, etc.).

A group of bug categories that are of interest can be provided to the machine learning system. Input data used to train the model can include both buggy and bug-free code. Bug-free code may be filtered out at any point before the data is provided to the machine learning model. Filtering can take place before data is provided to the data mining engine, before data is provided to the code analysis engine, before feature vector generation and/or before data is provided to the model generation engine.

Categories of bugs that can be filtered out include but are not limited to: bugs that are too challenging to detect using the machine learning system, bug categories that are of no interest to a user, bug categories whose inclusion decreases the accuracy of the trained model and so on. Bugs that are too challenging to detect using the machine learning system can include bugs that do not have shared characteristics and therefore are difficult for the model to learn how to detect them. Categories of bugs that are of no interest to a user can be filtered out to reduce processing overhead. If a desired accuracy level in the trained model is not reached, filtering out specified bug categories may improve accuracy level. For example, if a thorough accessibility pass were performed manually, it could be inferred that any detected accessibility bugs are false positives and can therefore be disregarded. In this case, a model that has not been trained with accessibility bugs may be more accurate than one that has been trained with accessibility bugs. Filtering can be iterative. Iterative filtering refers to repeatedly filtering out bug categories provided to the training engine in an attempt to improve the accuracy of the model, thereby attempting to eliminate categories resulting in poor model performance In accordance with some aspects of the subject matter disclosed herein, the source code for a bug of an excluded category or categories can be excluded by labeling the data as bug-free. The bug-free data can be excluded from the training phase entirely.

Some bug trackers may assign multiple categories to the same bug. In accordance with some aspects of the subject matter disclosed herein, the data including the bug can be included in the data provided to the machine learning system if one or more of the categories assigned to the bug are included in a list of included bugs provided to the machine learning system. The data including the bug can be excluded from the data provided to the machine learning system if one or more of the categories assigned to the bug are included in a list of excluded categories provided to the machine learning system.

The data mining engine 106 can search or mine the source code repository 104 for one or more source code files having been modified to fix bugs of a particular category and for source code files that have not had bug fixes for that category. The data mining engine 106 can generate mined data 108 that includes an original source code file 105 with a flag 107 appended to each line or source code statement 109. The flag 107 can indicate whether the line has a bug of a specified category or group of categories or does not have a bug of a specified category or group of categories. The flag 107 can indicate the type or category of bug in the line. The data mining engine 106 can perform the filtering or can call a filter 119. The mined data 108 can be input to a code analysis engine 110 that can analyze each source code statement to extract features which can be transformed into training data 112 that includes the flag 107 and the extracted features 111.

Buggy training data can be segregated into different groups of data by the category of bug. For example, one group of training data can comprise training data for one category of bug or group of bugs. A second group of training data can comprise training data for another category of bug or group of bugs. Training a model with the first group of training data can produce a different model than training a model with the second group of training data. The training data 112 can be analyzed by the training engine 114. The training engine 114 can include a feature vector generation engine 123 and a model generation engine 117. The feature vector generation engine 123 can receive the training data 112 and can transform the training data 112 into feature vectors. The feature vectors can be input to the model generation engine 117 to train a probabilistic machine learning model 116 to determine a probability of the existence of a type or category of software bug. The training data 112 may be split to train the model 116 and to test the model 116 in any manner In accordance with some aspects of the subject matter disclosed herein, the training data 112 may be split so that 60 percent is used to train the model 116 and 40 percent is used to test the model 116. The model 116 can be trained to achieve a specified level of accuracy or the maximum accuracy achievable within a specified number of cycles, epochs, or time.

The code analysis engine 110 can analyze the syntactic structure of the source code files at different granularities to find patterns indicative of a category or categories of software bug and/or indicative of no software bugs of that category or categories. In accordance with some aspects of the subject matter described herein, lines of source code from source code files with bugs of a particular category or categories and without bugs of that category or categories can be analyzed. Each element in a line of source code can be replaced with a token that is based on the grammar of the underlying programming language. The tokens in a window of a contiguous set of source code statements can be aggregated to form a feature vector that trains the machine learning model.

In accordance with some aspects of the subject matter disclosed herein, a source code file can be partially tokenized with each line of source code including a combination of tokens and source code. Each line of source code can be analyzed on a character-by-character or chunk-by-chunk basis to identify characters or chunks that are associated with and without software bugs. A chunk is a predetermined number of characters. Certain elements in the source code file can be replaced or concatenated with tokens. Contiguous chunks of source code can be grouped into a window. The window can be converted into a binary representation or feature vectors that train a machine learning model, such as a recurrent neural network (RNN).

In accordance with some aspects of the subject matter disclosed herein, the lines of a source code file can be analyzed with respect to various metrics that measure the number of variables in a line of source code, the number of mathematical operations in a line of source code, the number of a particular data type of elements referenced in a line of source code, the number of loop constructs in a line of source code, the usage of a particular method in a line of source code, and the usage of a particular data type in a line of source code. These features can be used to form feature vectors that train the machine learning model. The metrics can be modified to accommodate the nature of the source code being analyzed.

In accordance with some aspects of the subject matter disclosed herein, the methods and/or classes in a source code file may be analyzed instead of the lines of source code. Each method and/or class may be analyzed for metrics identifying the type of elements in each method/class, the number of variables in a line of source code, the number of mathematical operations in a line of source code, the number of a particular data type referenced in a line of source code, the number of loop constructs in a line of source code, the usage of a particular method in a line of source code, and the usage of a particular data type in a line of source code, and/or any combination thereof. These features can be converted into a binary representation or feature vectors that train the machine learning model.

Models can be layered to provide information on the type of the detected bug. Layering refers to first running one model and then running the next model and so on. One or more of the models can also be run simultaneously. When models are layered, each model may employ a different technique (e.g., fully or partially tokenized, using metrics to analyze or other approach) and/or focus on detecting a particular category or type of bug. Use of different techniques in each layer may improve results. Use of different techniques in each layer can make improving the model easier. A user (e.g., administrator, implementer, etc.) can be provided with settings for switching the different layers on and off. Alternatively, results marked as belonging to a particular category or categories of software bug can be excluded from a particular model. A layered model can be optimized into a single model which may be more performant than a layered model.

Figure 1B:
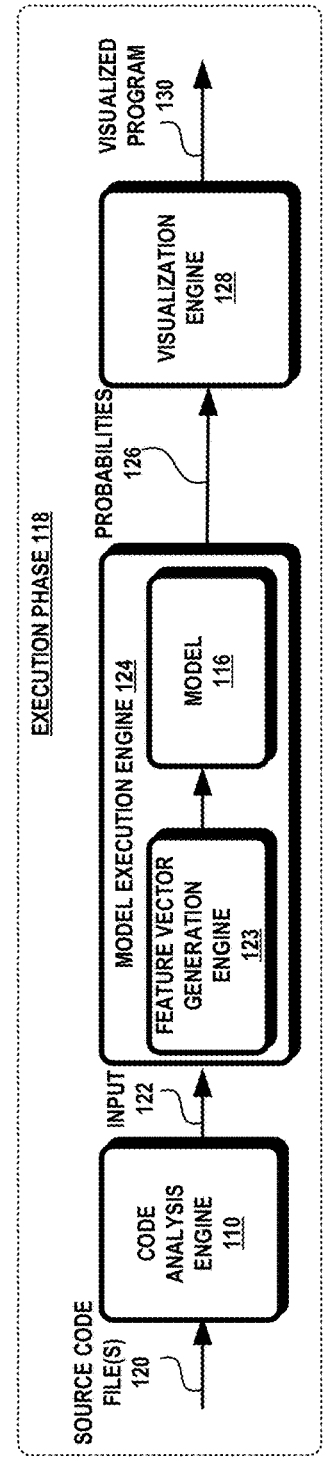
FIG. 1B is a block diagram illustrating an example of a system for executing a machine learning model on a target source code file in accordance with aspects of the subject matter disclosed herein.

FIG. 1B illustrates an example of a configuration of an execution phase 118 that utilizes the model to predict the existence of software bugs in a source code file(s) 120. In the execution phase 118, the code analysis engine 110 can extract features from a designated portion (e.g., line, method, class) of a source code file(s) 120 which can be input into a model execution engine 124. The model execution engine 124 can include a feature vector generation engine 123 and a model 116. The feature vector generation engine 123 can convert the features or input 122 into feature vectors that are input to the model 116. The model 116 can output probabilities 126 for each designated portion that indicates the probability of a particular source code statement having a particular type or category of bug. The probabilities 126 for each portion of the source code may be input into a visualization engine 128 that identifies potential software bugs in a virtualized program 130.

In accordance with some aspects of the subject matter disclosed herein, the visualization engine can be part of a source code editor or an integrated development environment (IDE). In accordance with some aspects of the subject matter disclosed herein, the visualization may be part of a user interface, a browser, or other type of application configured to present the source code file and model output in a visual manner.

Attention now turns to a description of the operations for the aspects of the subject matter described with reference to various examples of methods. It will be appreciated that the representative methods do not necessarily have to be executed in the order presented, or in any particular order, unless otherwise indicated. The methods may be representative of some or all of the operations executed by one or more aspects described herein and that the method can include more or fewer operations than that which is described. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints.

Figure 2:
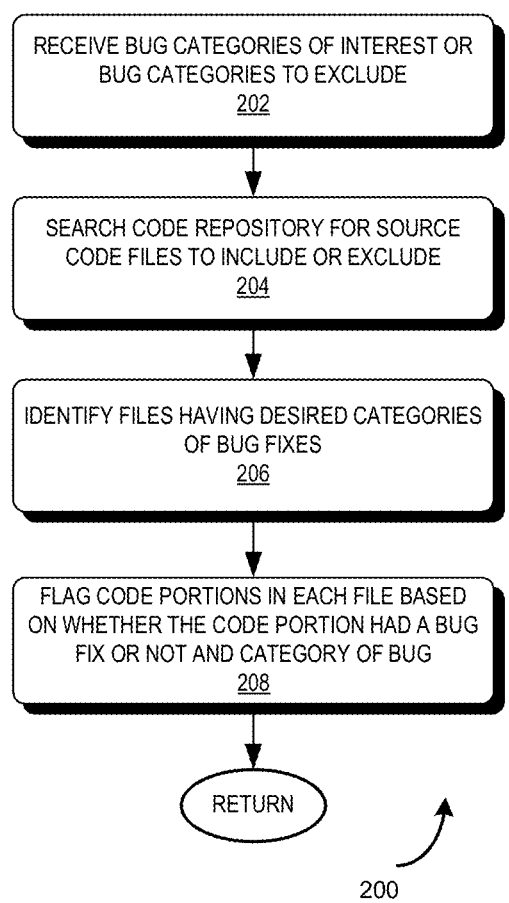
FIG. 2 is a flow diagram of an example of a method for mining source code repositories for training and testing data in accordance with aspects of the subject matter disclosed herein.

FIG. 2 illustrates a flow diagram of an example of a method 200 of the data mining engine 106. Referring to FIG. 2, an indication of the bug category or categories or the group of bug categories of interest can be provided (block 202). Alternatively, an indication of the bug category or categories or the group of bug categories to be excluded can be provided. The data mining engine can search a source code repository for examples of source code files with bugs (block 204). For each bug in the files, the data mining engine can query the bug tracker for the type or category of the bug (block 206). If the type or category of the bug category received from the bug tracker is a category of interest, the data mining engine can add the data to the mined data, filtering out all unselected bug categories. The data mining engine can search a source code repository for examples of data without the bug category or categories. The data mining engine can search a source code repository for buggy data. If the bugs to be excluded are provided, the bugs to be excluded can be filtered out (block 204). Bug-free data can be excluded.

The source code repository may be a version control system such as Apache Subversion or GIT. However, the subject matter disclosed herein is not limited to a source code repository and other sources including source code may be utilized as well. For example, without limitation, the data mining engine 106 may search source code files belonging to a particular project in an integrated development environment (IDE), and/or search source code files associated with a particular storage location (e.g., directory, cloud storage, etc.).

The data mining engine can tag each line of a source code file with a flag that identifies whether the line of source code includes a bug or not. The data mining engine can tag each line of a source code file with a flag that identifies the type or category of bug in the line of source code (block 208). These annotated files can be input to the code analysis engine.

Figure 3:
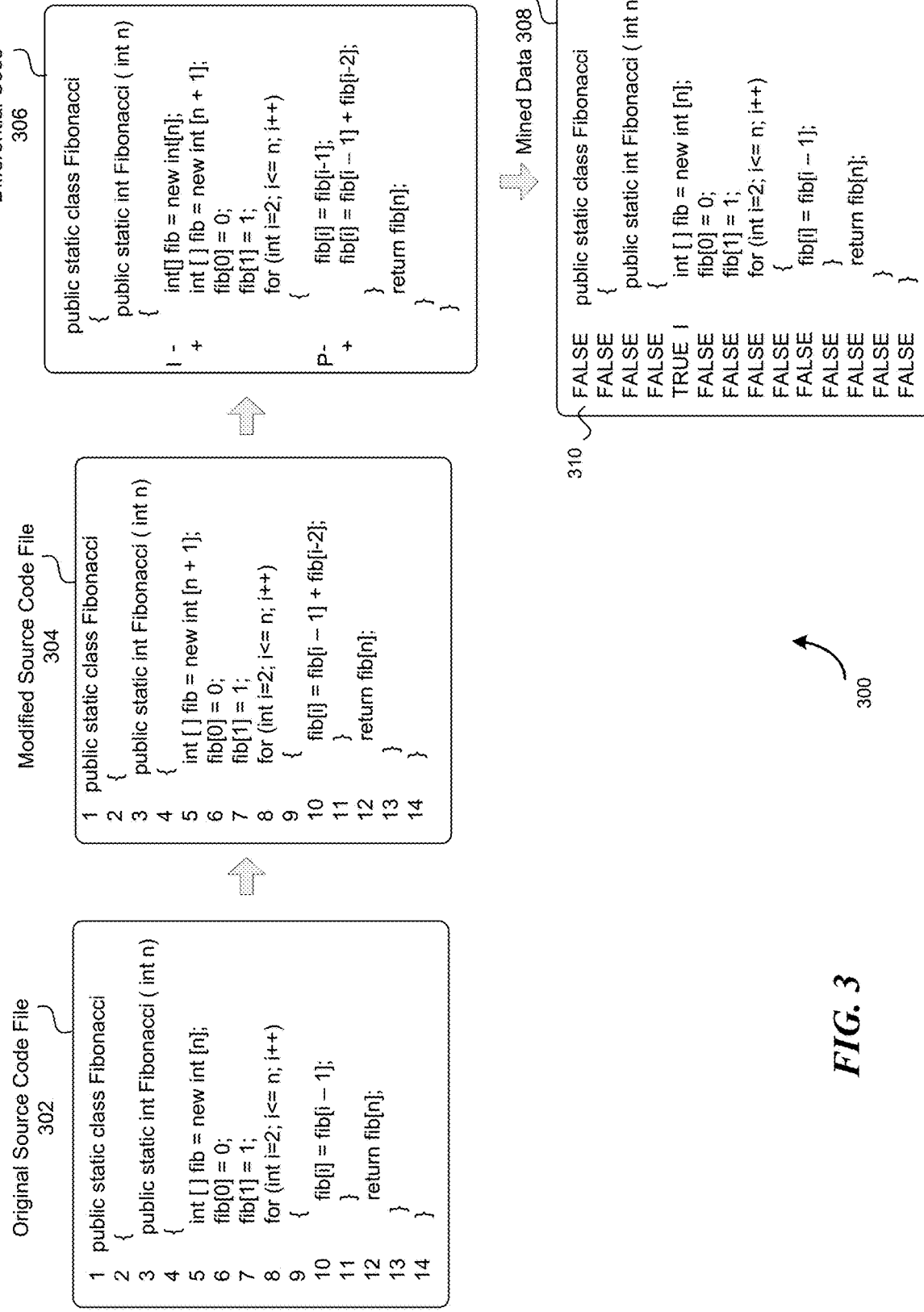
FIG. 3 is an example illustrating operations of the data mining engine on a program in accordance with aspects of the subject matter disclosed herein.

FIG. 3 illustrates an example of operations 300 of the data mining engine with respect to an example of a source code file. Turning to FIG. 3, there is shown a portion of an original source code file 302 written in C# having 14 lines of code or source code statements. For the purposes of this example, a source code statement is identified as being a continuous sequence of code elements that ends at a semicolon. This original source code file 302 may be stored in a source code repository. The original source code file 302 may have been checked out of the source code repository. The original source code file 304 shows a modified version of the original source code file 302 which corrects two software bugs at line 5 and 10.

The source code repository may track these changes and attribute them to bug fixes. Differential code 306 illustrates the differences between the original source code file 302 and the modified source code file 304 where the source code statement "int[ ] fib=new int[n]" is annotated with the "−" symbol indicating that the associated code statement was altered. In addition, differential code 306 shows the source code statement "int [ ] fib=new int [n+1]" annotated with a "+" symbol indicating that the associated code statement is the modification. The data mining engine can read the tracked changes of a source code file (i.e., change sets) and can annotate the source code file with a flag that indicates whether or not each source code statement includes a bug. The data mining engine can query the bug tracker to determine the type or category of the bug. The data mining engine can annotate the line of the source code file with the type or category of bug in the source code. For example, the mined data 308 represents the original source code file 302 annotated with a flag (e.g., flag 310) at each line, where the flag "FALSE" denotes that there is no bug in a source code statement, the flag "TRUE" denotes a software bug is in the source code statement. The flag "I" of source code line 5 indicates that the bug is of category "I". The flag "P" of source code line 10 indicates that the bug is of category "P". If bugs of category "I" are of interest but bugs of category "P" are to be excluded, the "TRUE" flag of source code line 10 can be changed to "FALSE". This mined data 308 can be input to the code analysis engine.

Figure 4:
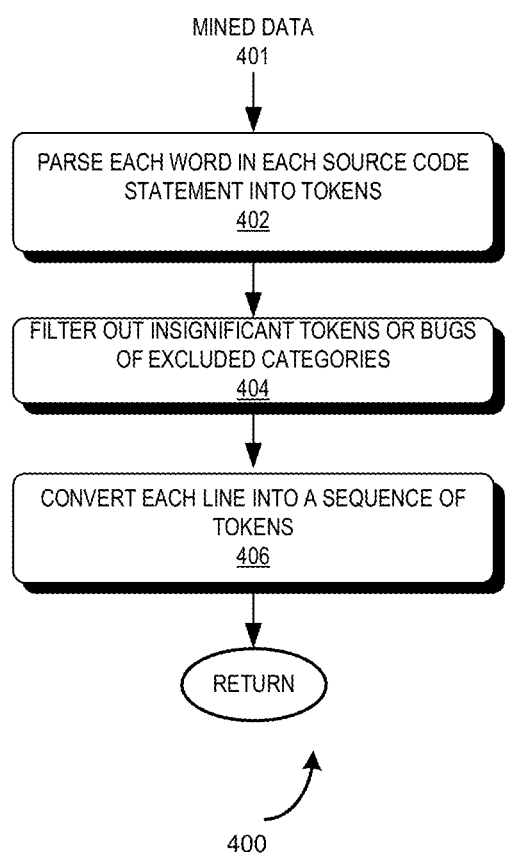
FIG. 4 is a flow diagram of an example of a method for generating the training data in accordance with aspects of the subject matter disclosed herein.

FIG. 4 illustrates a flow diagram of an example of a method 400 of the code analysis engine 110 during the training phase. The code analysis engine 110 can analyze the mined data 401 to reduce the code input to its essential elements and to identify the more relevant data. The analysis can proceed by parsing each source code statement into tokens, using the grammar of the programming language of the source code file (block 402). A token is a lexical atom and the smallest element in the grammar of the programming language in which the program is written. For example, a source code statement written in C# that reads "result=input1+input2", can be parsed into a sequence of tokens as follows: "Variable/Assignment Operator/Variable/Addition Operation/Variable/EndOfLine." The element "result" is represented by the token "Variable", element "=" is represented by the token "Assignment Operator", the element "input1" is represented by the token "Variable", the element "+" is represented by the token "Addition Operation", the element "input2" is represented by the token "Variable", and the token "EndOfLine" or "EOL" represents the end of a source code statement.

The code analysis engine optionally can filter out certain tokens deemed to be insignificant, such as comments, whitespace, etc., and code changes that are not of interest (block 404), such as for example, code changes associated with specified types of bugs, as indicated by the type of bug flag. Each element in a line can be replaced with a corresponding token thereby transforming the source code statement into a sequence of tokens where each token corresponds to an element in the original source code statement (block 406).

FIG. 5 continues the example shown in FIG. 3 and illustrates an example of operations 500 of the code analysis engine. Turning to FIG. 5, there is shown the mined data 308 of FIG. 3 and the corresponding training data 502 output from the code analysis engine. For each line of source code shown in the mined data 308, there is a corresponding line in the training data 502 which includes the flag indicating the type of bug in the line of code and the sequence of tokens that are associated with the line of code. For example, the first line of mined data 308 is the flag 610 followed by "public static class Fibonacci" where "FALSE" indicates that there is no bug in the corresponding source code statement "public static class Fibonacci." The corresponding entry in the training data 502 is " FALSE ClassDeclaration/ PublicKeyword/StaticKeyword/ClassKeyword/Identifier-Token/EOL" where token "ClassDeclaration" refers to the entire statement "public static class Fibonacci" representing a class declaration, the token "PublicKeyword" corresponds to "public", the token "StaticKeyword" corresponds to "static", the token "ClassKeyword" corresponds to "class" and the token "Identifier Token" corresponds to "Fibonacci."

Figure 6:
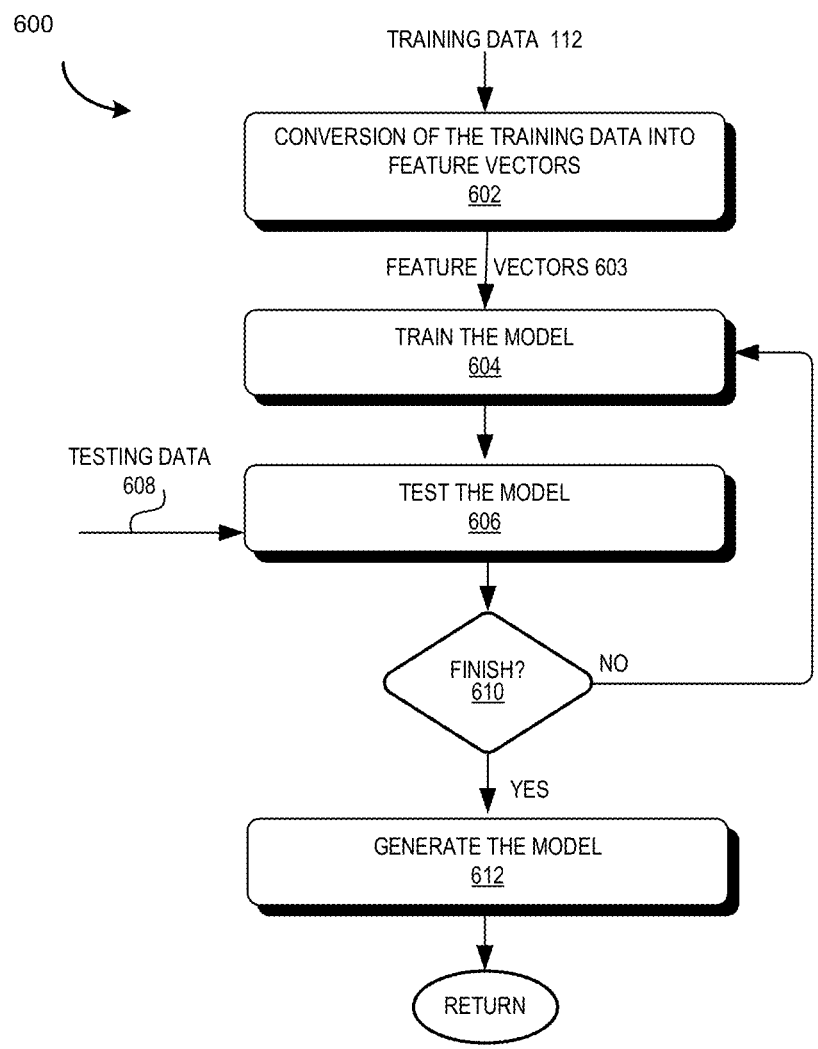
FIG. 6 is a flow diagram of an example of a method of generating a model in accordance with aspects of the subject matter disclosed herein.

FIG. 6 illustrates a flow diagram of an example of a method 600 of the training engine. In accordance with some aspects of the subject matter disclosed herein, the training engine can utilize machine learning techniques to find patterns in the training data that are highly indicative of a type or category of bug. There are various types of machine learning techniques which are well-known, such as support vector machines (SVM), deep neural networks (DNN), recurrent neural networks (RNN), artificial neural networks (ANN), long short term memory (LSTM) and so forth.

In accordance with some aspects of the subject matter disclosed herein, the method can utilize a long short term memory (LSTM) neural network as the model for source code bug type inference. Alternatively, other probabilistic machine learning techniques may be utilized. The LSTM architecture includes an input layer, one or more hidden layers in the middle with recurrent connections between the hidden layers at different times, and an output layer. Each layer represents a set of nodes and the layers are connected with weights. The input layer $x_t$ represents an input at time t and the output layer $y_t$ produces a probability distribution. The hidden layers $h_t$ maintain a representation of the history of the training data. Gating units are used to modulate the input, output, and hidden-to-hidden transitions in order to keep track of a longer history of the training data.

Typical LSTM architectures implement the following operations:

$i_t = \sigma_t(W_{xt} x_t + W_{ht} h_{t-1} + W_{ci} c_{t-1} + b_i)$
$f_t = \sigma(W_{xf} + W_h h_{t-1} W_{cf} C_{t-1} b_f)$
$c_t = f_t \odot c_{t-1} + i_t \odot \tan h(W_{xc} x_t + W_{hc} h_{t-1} + b_c)$
$o_t = \sigma(W_{xo} x_t W_h h_{t-1} W_{co} c_t b_0)$
$h_t = o_t \odot \tan h(c_t)$ where $i_t$, $o_t$, $f_t$ are input, output and forget gates respectively, $c_t$ is memory cell activity, $x_t$ and $h_t$ are the input and output of the LSTM respectively, ⊙ is an element wise product, and σ is the sigmoid function.

The training engine can transform the windows of the raw training data (e.g., sequences of training data) into a binary representation that is used as the feature vectors. The training engine can use the feature vectors to determine the appropriate weights and parameters for the LSTM model.

In accordance with some aspects of the subject matter disclosed herein, each line of the training data can be optionally limited to a fixed length of 250 tokens. Lines with fewer than 250 tokens can be padded with EndOfLine tokens. The code analysis engine can choose to utilize only 439 tokens of the grammar of the underlying programming language in order to exclude trivial and superfluous elements. Each token in a line can be represented by a bit pattern that includes 439 bits, where each bit represents a particular token. Each line of source code can then be represented by 109,750 bits (i.e., 250 tokens multiplied by 439 bits).

A size of a window may be determined by analyzing the success of the model with the testing data. Alternatively, a window may be of a reasonable size based on the available computational resources. The window size may be one. In accordance with some aspects of the subject matter disclosed herein, the window comprises seven (7) source code lines. The window can include a current line along with the immediately preceding three (3) lines and the immediately succeeding three (3) lines. Special padding can be used for both the first and last three (3) lines of source code which may not have immediately preceding/following lines of code. Each window can be labeled with a flag indicating the type of software bug in the current line. The training data may include a relatively equal number of lines having bugs and not having bugs in order to reduce potential bias and increase the accuracy of the model. Alternatively, instead of ensuring a relatively equal number of lines having bugs and not having bugs, the ultimate outcome of the model can be scaled by a factor determined by the proportion of lines having bugs to those not having bugs. Lines with fewer than three elements before padding can be ignored since they do not include a sufficient amount of data that can be of significance. With the window size of seven lines, a single feature vector will include 768,250 bits (i.e., 109,750 bits per line multiplied by a window size of 7).

Turning to FIG. 6, there is shown an example of a training phase. The training data 112 can be input to the training engine which can convert the training data into feature vectors 603 as described above (block 602). The feature vectors 603 can be used by the training engine to generate the weights and parameters of the model (block 604). The model can be tested with testing data 608 in order to determine the accuracy of the model (block 606). If the model does not meet an intended level of accuracy, the model weights may be adjusted to increase the sharpness of the model and/or additional training may be applied to the model. In this situation, the model is not finished (block 610—no) and can be retrained (block 604). In the event the model meets the intended level of accuracy or exceeds a number of epochs or time constraint (block 610—yes), the model can be deemed trained (block 612).

Figure 7:
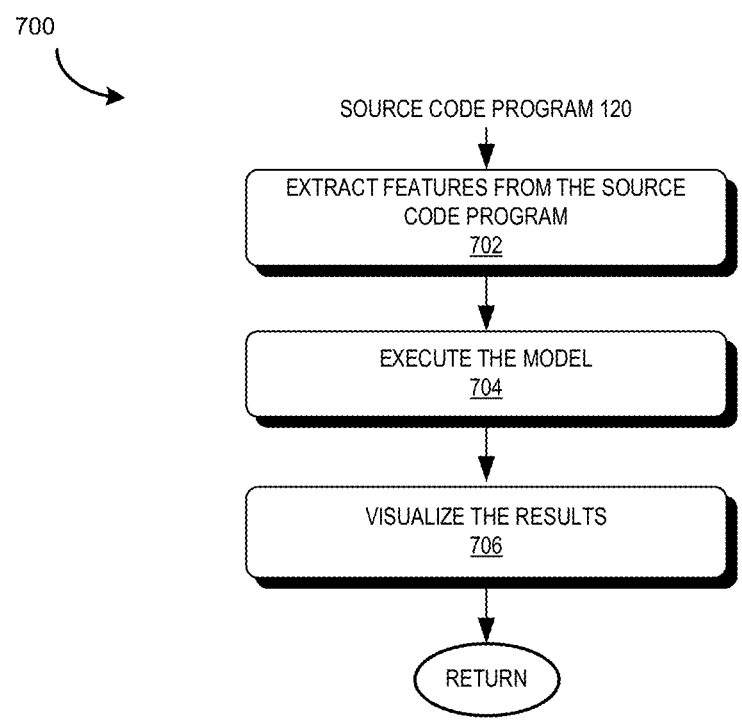
FIG. 7 is a flow diagram of an example of a method of generating a visualization of results in accordance with aspects of the subject matter disclosed herein.

FIG. 7 illustrates a flow diagram of an example of a method 700 of the execution phase. A source code file(s) 120 can be input into the code analysis program to convert the source code statements into the sequence of tokens (block 702). In the execution phase, the source code statements are not labeled with the TRUE and FALSE class labels (block 702). The sequence of tokens is then converted into feature vectors, as discussed above, and input to the model (block 702). The model is applied to these feature vectors and outputs a probability for each source code statement (block 704). The results may then be output to a visualization engine or output as desired (block 706).

Figure 8:
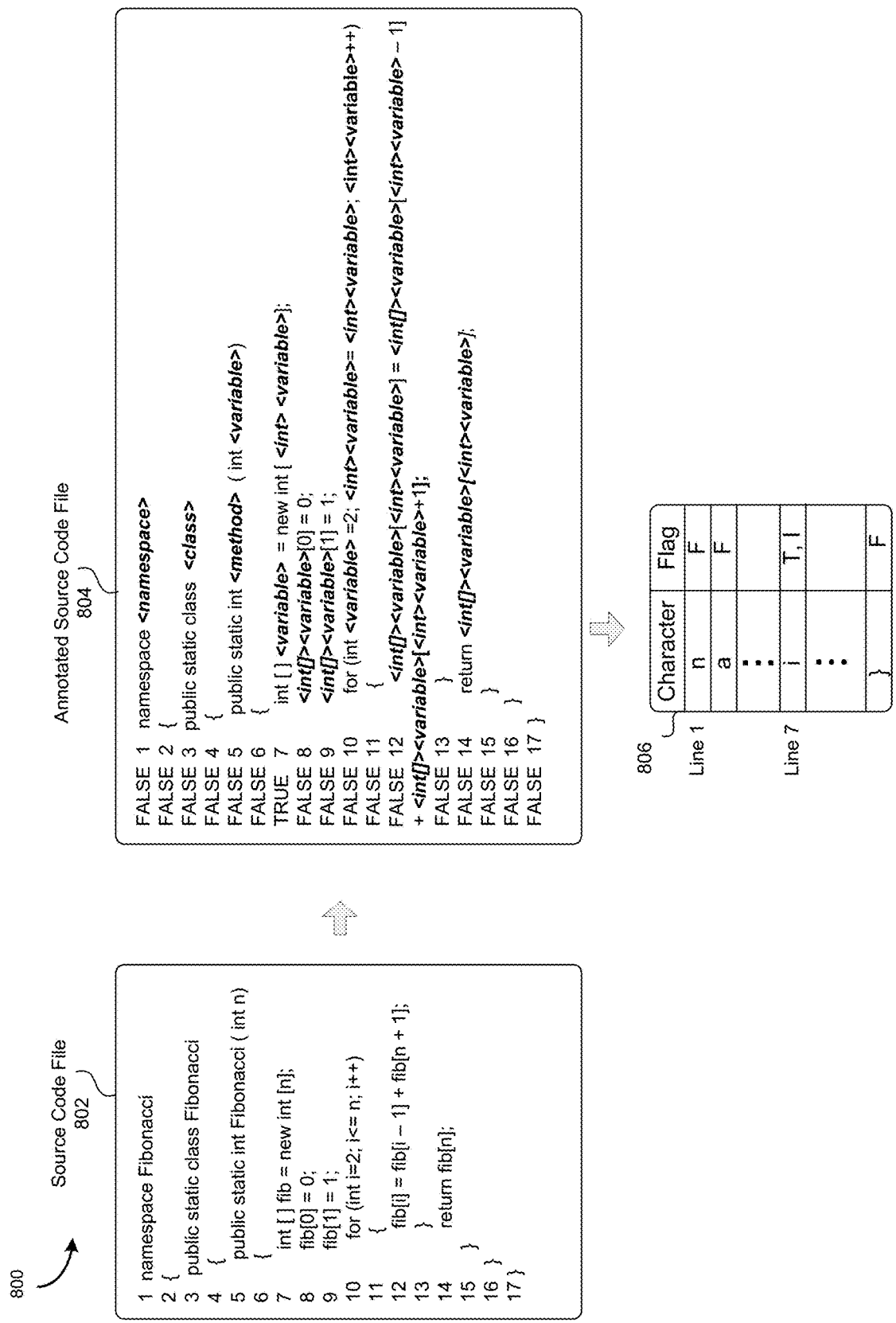
FIG. 8 is an example illustrating the operation of a training phase that incorporates syntactic information into a source code file in accordance with aspects of the subject matter disclosed herein.

FIG. 8 illustrates another aspect of the subject matter disclosed herein. This aspect is a variation of the aspect discussed above in FIGS. 1-7 and differs in that only certain elements in a source code statement are transformed into a token. The source code statements can be partially tokenized. A pre-configured group of elements can be identified and replaced by or concatenated with tokens in the source code file. A token is based on the grammar of the programming language of the source code file. For certain predetermined elements, these elements can be replaced with a token that describes its constituent element in the associated grammar This replacement adds additional context information to the source code file to more particularly identify the characteristics of a software code bug.

Turning to FIG. 8, there is shown an example 800 of the extraction of the features of a source code file in this second aspect. Referring to FIGS. 1 and 8, the data mining engine 106 can retrieve a source code file 802 which is sent to the code analysis engine 110. The code analysis engine 110 can analyze the source code file 802 and can annotate predetermined elements of the source code file 802 with tokens as shown in annotated source code 804. In the example shown in FIG. 8, the variable, class, method and namespace names have been replaced with a respective token, <variable>, <class>, <method>, <namespace>, that identifies the replaced element as a variable, class, method, namespace respectively. These tokens replace the names originally found in the source code file with a token that identifies a corresponding syntactic element. For example, the word "Fibonacci" in the source code statement "public static class Fibonacci" is replaced with <class> indicating that the source code line is associated with a class declaration. Likewise, the source code statement "int[ ] fib=new int[n]" replaces the variable name "fib" with the token <variable> indicating that "fib" is a variable and replaces "int n" with the tokens "int <variable>" indicating an integer variable.

Each character or chunk of characters of the annotated source code file can be flagged as either being associated with a software bug or not. For example, as shown in table 806 each character in the annotated source code file 804 is associated with a flag. The flag value "F" can indicate that the corresponding character is not associated with a software bug or is not associated with a software bug of a category that is of interest. The value "T" can indicate that the corresponding character is with a software bug of a category that is of interest. Instead of or in addition to the True/False flag, a flag such as the flag "I" can indicate that the software bug is of type "I". If chunks are used, then the table would identify whether each chunk is associated with a software bug nor not.

The annotated source code file 804 can be input into the training engine 114 which can transform the annotated source code statements into a binary representation or into feature vectors that train a machine learning model, such as a recurrent neural network (RNN). The training engine 114 can group contiguous source code statements preceding a particular source code statement using a window of a certain size into feature vectors which can be used to train the RNN.

Figure 9A:
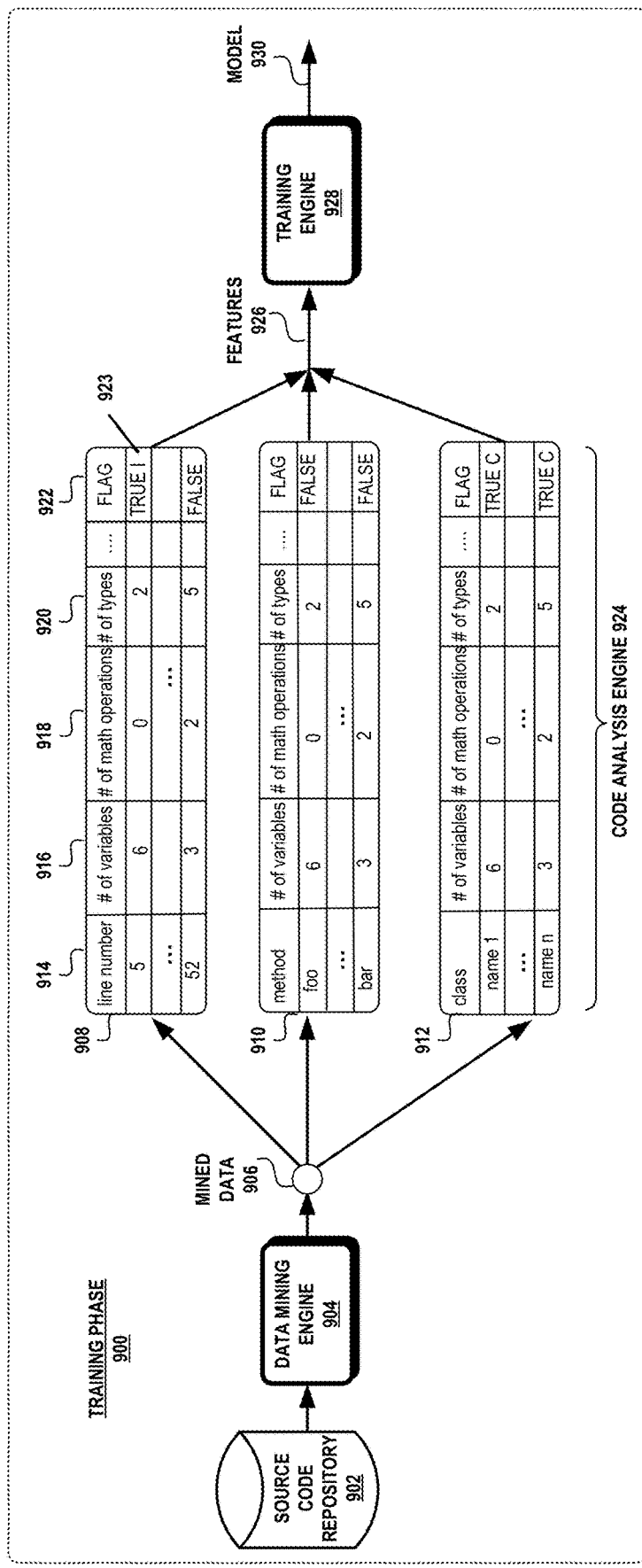
FIGS. 9A-9B are examples illustrating a system that utilizes metrics to train and execute a machine learning model to predict software bugs in accordance with aspects of the subject matter disclosed herein.
Figure 9B:
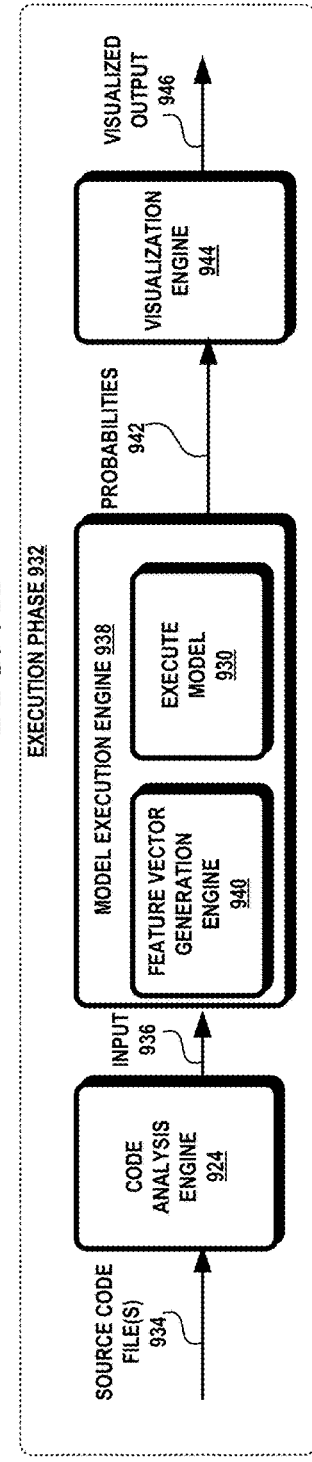

FIGS. 9A-9B illustrate another aspect of the subject matter disclosure herein, which uses metrics to train a machine learning model. Metrics can be based on the syntactic structure of the source code file. These metrics can include, without limitation, measurements or counts of different syntactic elements, such as the number of variables, the number of mathematical operations, the number of a particular data type of elements referenced, the number of loop constructs, the usage of a particular method, and/or usage of a particular data type in the source code. Metrics can be used to identify the context in which a category of software bug exists.

Referring to FIG. 9A, there is shown a training phase of a system 900 where the data mining engine 904 searches a source code repository 902 for mined data 906 including source code files with and without a category or categories of software bugs. Each line of source code in a mined source code file can be flagged to indicate whether or not that line includes a software bug of a category or categories of interest. A code analysis engine 924 can analyze the mined source code file to generate a table 908, 910, and/or 912 that can tabulate metrics for a particular portion of a source code file. The metrics can be generated for each line 914 of the source code file as shown in table 908, for each method of the source code file as shown in table 910, for each class in the source code file as shown in table 912, and for any combinations thereof. The metrics can include the number of variables 916, the number of mathematical operations 918, the number of a particular data type referenced 920, the number of loop constructs, the usage of a particular method, and the usage of a particular data type in a line of source code, in a method, or in a class. Each line in a table can be labeled with a flag such as flag 922 that indicates whether or not the corresponding line, method or class includes a software bug. Each line in a table can be labeled with one or more flags such as flag 923 that indicates whether or not the corresponding line, method or class includes a category or categories of software bugs.

The extracted features 926 can be input to the training engine 928 which can transform them into a binary representation or feature vectors that can train a machine learning model 930. The training engine 928 can include a feature vector generation engine 123 and model generation engine 117 as shown in the training engine 114 of FIG. 1. In accordance with some aspects of the subject matter disclosed herein, the machine learning model 930 may be an artificial neural network (ANN), such as a feed forward neural network (FNN). The ANN can be trained with testing data including feature vectors associated with source code having a software bug of a category or categories of interest and feature vectors not having software bugs of a category or categories of interest.

When the ANN has been trained and tested to meet a specified threshold, machine learning model 930 is ready. FIG. 9B illustrates an example of the execution phase 932 which uses the machine learning model 930 on one or more source code files such as source code file 934. The code analysis engine 924 can read a source code file 934 to extract the metrics which can be passed as input 936 to the model execution engine 938. The model execution engine can include a feature vector generation engine 940 that can transform the input 936 into feature vectors that can be passed to the machine learning model 930. The machine learning model 930 can generate probabilities 942 representing a likelihood of a portion of source code file having a software bug of a category or categories of interest. The visualization engine 944 can receive the probabilities and can generate a visual output 946.

Visualization

Figure 10B:
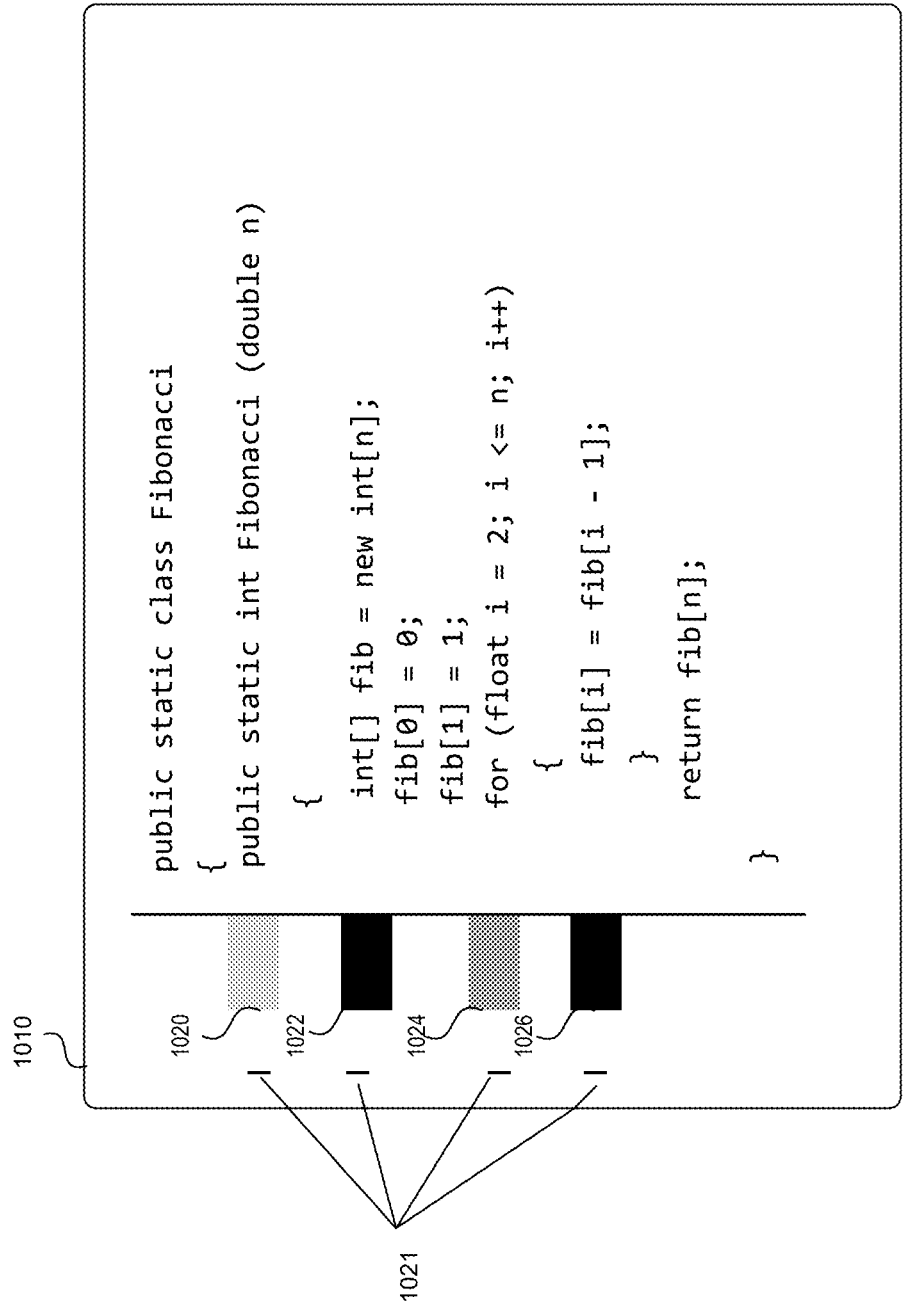

In accordance with some aspects of the subject matter discussed herein, the output from the model execution engine 124 can be input to a visualization engine 128 that can provide a visualization of the results from the model. In accordance with some aspects of the subject matter disclosed herein, the visualization engine 128 can display a portion of the source code file. The portion of the source code file can be displayed with certain lines of code highlighted in different shades or colors. The different shaded and/or highlighted lines can indicate different probabilities that a corresponding line includes a bug of a category or categories of interest. For example, in FIG. 10A, there is shown a segment of a source code file 1000 having four lines of source code enclosed in a box, 1002, 1004, 1006, 1008. The boxes can be highlighted in different colors with each color indicating a particular probability or indicating that the probability of a line including a bug category (e.g., bug category I 1003) associated with a line exceeds a threshold. Alternatively, the boxes can be shaded in one color and the text can be displayed in another color.

Icons can be affixed next to a particular line of source code where the icons indicate different probabilities of the associated line including a software bug of a category or categories of interest (e.g., bug category "I"). For example, in FIG. 10B there is shown a segment of a source code file 1010 with shaded boxes 1020, 1022, 1024, and 1026 adjacent to different lines of source code. Shaded boxes 1022 and 1026 can represent a higher likelihood of the adjacent source code lines having a software bug of a category or categories of interest (e.g., bug category "I" 1021) than the source code lines adjacent to shaded boxes 1020 and 1024. Some icons can be associated with certain bug categories, for example the wheelchair icon could be placed next to accessibility bugs.

Figure 10C:
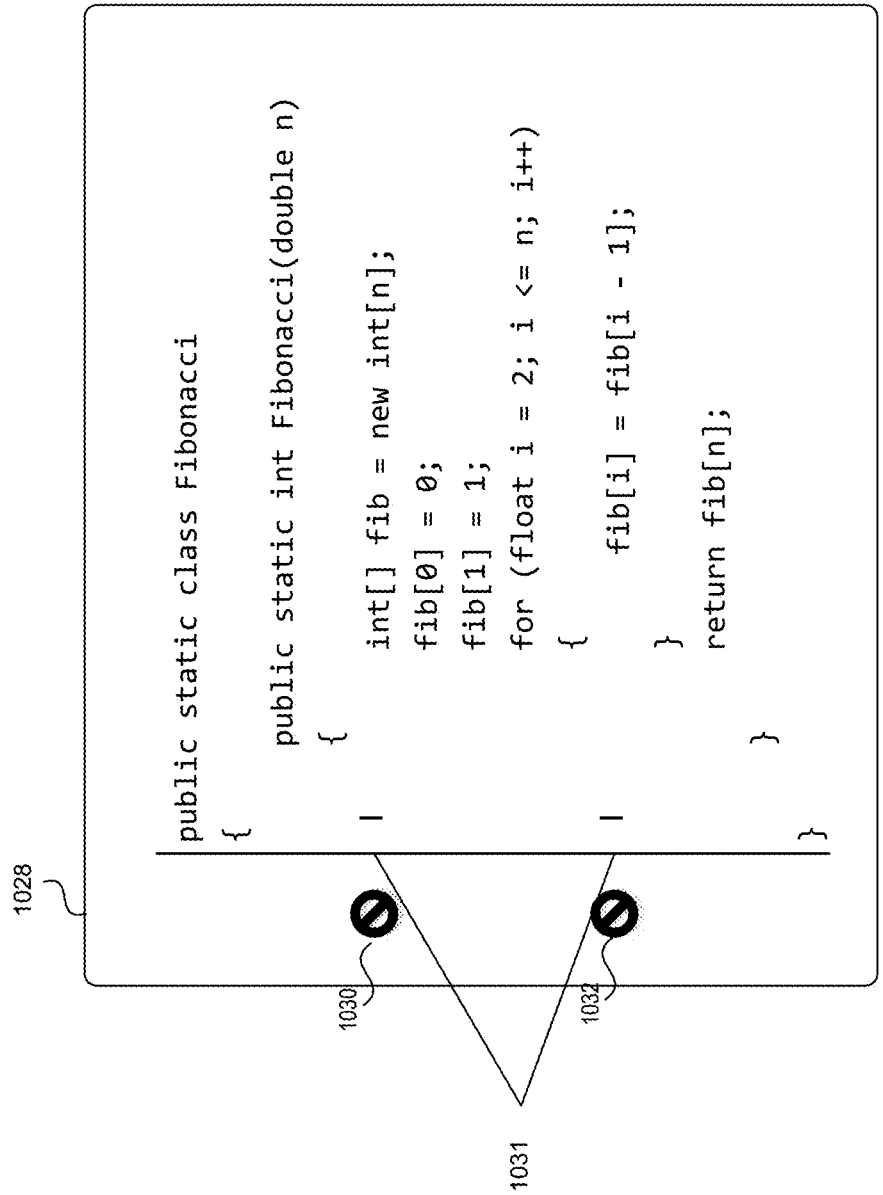
Figure 10D:
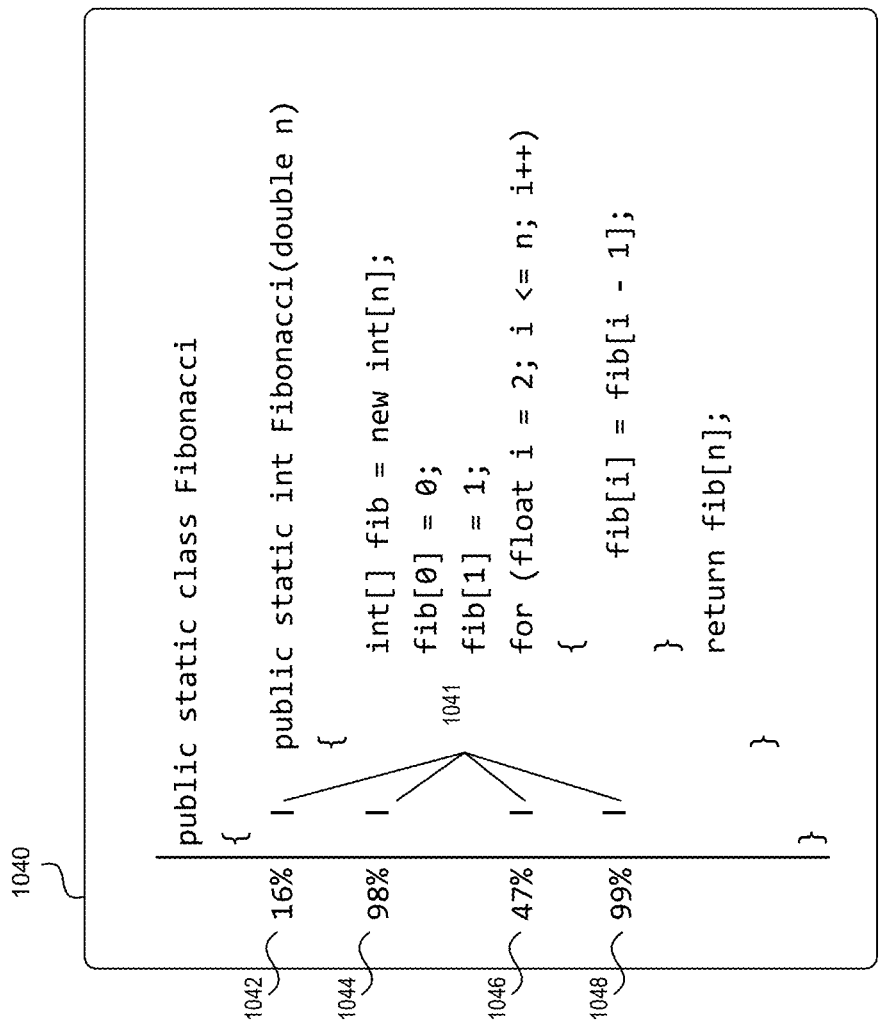

FIG. 10C shows a segment of a source code file 1028 having two icons, 1030, 1032, representing the two source code statements having a high likelihood of a software bug of a particular category (e.g., category "I" 1031). FIG. 10D shows the numeric value of the probability displayed adjacent to four lines of source code having the highest likelihood of a bug of a category I 1041. As shown in FIG. 10D, there is a segment of a source code file 1040 that includes the source code statement "public static int Fibonacci (double n)" has a 16% probability 1042 of including a software bug of a category or categories of interest (e.g., category "I" 1041), the source code statement "int[ ] fib=new int[n]" has a 98% probability 1044 of including a software bug of the category or categories of interest (e.g., category "I" 1041), the source code statement "for (float i=2; i<=n; i++)" has a 47% probability 1046 of including a software bug of the category or categories of interest (e.g., category "I" 1041), and the source code statement "fib[i]=fib[i−1]" has a 99% probability 1048 of including a software bug of the category or categories of interest (e.g., category "I" 1041).

FIG. 10E illustrates an example in which the numeric value of the probability displayed adjacent to four lines of source code having the highest likelihood of belonging to a particular team (e.g., Team A 1050). The source code statement "int[ ] fib=new int[n]" has a 94% probability 1045 of belonging to Team A, the source code statement "for (float i=2; i<=n; i++)" has a 47% probability 1047 of to Team A 1050, and the source code statement "fib[i]=fib[i−1]" has a 95% probability 1049 of belonging to Team A 1050.

It will be appreciated that the subject matter disclosed herein is not limited to a particular virtualization technique or format and that other techniques and formats may be utilized to visualize the output of the machine learning model. It will be appreciated that although described in the context of software, the subject matter disclosed herein is not so limited. For example, the mechanisms described herein can analyze hardware defined in an HDL (hardware description language) to extract features of hardware design that represent patterns indicative of hardware design flaws.

Inferring Team Boundaries from Inferred Bug Categories

The bug category information inferred by the machine learning system can be used to determine team boundaries by assuming that bug categories localized to particular groups of developers are indicative of developers working as a team. Bug category can be related to the logic used by a particular team. For example, a team producing code for an on-line retailer may have a tendency to have bugs associated with mathematical calculations while a team involved in producing software displaying data may have a tendency to have bugs related to characteristics of user interfaces (e.g., such as but not limited bugs related to graphs and charts). Bug categories associated with a particular method can be indicative of a team boundary because, for example, the method is typically only used by members of a particular team. Inferred team boundaries can be logical teams, that is, groups of people who work together on a project but who do not necessarily correspond to an organizational structure. This information can be useful for constructing team-specific analyses as the team boundaries inferred through machine learning are dependent on code characteristics rather than organizational boundaries.

For example, a particular set of source code files, such as the source code files of a particular developer or group of developers, (e.g., members on the same programming team or project) can be associated with a particular subgroup of an organization. These source code files can be selected to train a customized model suited for a particular developer, group of developers, and/or team within an organizational boundary. This customized model can use inferred teams or teams defined through organizational boundaries. The customized model can learn the programming habits and/or style (including but not limited to utilization or non-utilization of particular code constructs, functions, methods, subroutines, classes or namespaces) of the developer, group of developers, and team. In an execution phase, a target source code file can be analyzed by the customized model. The results of the customized model can be visualized with the target source code file. The results of a group of customized models can be aggregated into a single result. The results of one or more of the models can be weighted so that, for example, the results of certain models are given a higher weight than the results of other models. The results of some models can be excluded. The application of the various models to a target source code can avoid the detection of issues associated with a developer belonging to one organizational sub-group being incorrectly detected in the source code of another developer in another organizational sub-group. Unsupervised learning, clustering and/or classification can group together bugs with similar characteristics. After clustering, the software developers associated with each type of bug can be determined. If particular categories of bugs are restricted (or primarily restricted) to groups of developers, it can be inferred that these groups of developers constitute teams of developers.

The inference of groups can occur using supervised or unsupervised machine learning techniques. Although all of the types of models described herein can identify team boundaries, models that retain the characters of the source code (e.g., do not replace source code statements with source-code tokens), may be particularly well-suited to accurately identify team boundaries because teams can be more likely to call particular methods, functions or classes. Thus identification of bugs related to the particular methods, functions or classes can be used to identify team boundaries.

Data supplied to the unsupervised learning, clustering and/or classification algorithm can exclude information on whether each element is buggy or bug-free. Exclusion of this information can be used to relate code characteristics with one or more software developers, enabling the inference of team boundaries from all code rather than from only the buggy code. This can be particularly useful in the case of the shared methods, functions or classes as these may be used sufficiently to infer team boundaries, but an insufficient number of bugs may be introduced in their usage to allow determination through a model to which only buggy data is provided.

The teams inferred through the machine learning system can be used for team-specific analyses. The team boundaries can be aligned with the bug types introduced rather than through the organizational hierarchy and may be more accurate. This can be especially true in those organizations in which the management hierarchy is not reflective of where people work in a codebase. Both approaches can be combined in different layers.

Technical Effect

Aspects of the subject matter disclosed herein pertain to the technical problem of determining the probability of a software bug of a category or categories of interest being present in a source code file in a relevant and meaningful manner The technical features associated with addressing this problem involve a technique that models the context or syntactic structure of portions of a source code file (i.e., source code statements, methods, classes) with and without software bugs of a category or categories of interest to generate a machine learning model to predict the probability of a source code file including software bugs of a category or categories of interest. Accordingly, aspects of the disclosure exhibit technical effects with respect to detecting a software bug of a category or categories of interest in a portion of a source code file by source code files extracting significant syntactic features that yield patterns that can be learned to predict a likelihood of the existence of a software bug of a category or categories of interest.

CONCLUSION

Described herein is a system that includes a memory and at least one processor, the at least one processor configured to use a machine learning system to infer at least one of a plurality of bug categories associated with at least one of a plurality of source code statements from at least one source code file. The system can filter out at least one of the plurality of bug categories associated with the at least one of the plurality of source code statements during a training phase of the machine learning system. The system can infer a team to which a developer belongs by presence of at least one of a plurality of bug categories in source code written by a developer. The system can group bugs and bug fixes within the source data by bug category. The system can group bugs by bug category within the source data into a plurality of bug categories through unsupervised machine learning. The system can receive bug category information from a bug tracker. This information can be used to train the machine learning system. The system can infer bug category information using unsupervised machine learning. The system can visualize at least one source code statement from a target source code file with a corresponding probability of a bug category for the at least one source code statement. The system can visualize the at least one source code statement from a target source code file with a corresponding probable category of bug. The system can visualize the at least one source code statement from a target source code file with a corresponding probable team to which a developer belongs.

Described herein is a method comprising configuring a processor to include a bug category associated with a bug in output of a data mining process mining source code having at least one category of software bug and provide the output of the data mining process to a training phase of a machine learning process. It can generate output of an execution phase of the machine learning process comprising probable category of bug present in source code and probability of the probable bug category for at least one source code statement of the source code. The method can infer team boundaries by correlating characteristics of source code with groups of developers. The method can infer organizational boundaries by correlating characteristics of source code with groups of developers. The method can infer team boundaries comprising logical teams.

Described herein is a device that includes a memory and at least one processor. The processor can be configured to include a bug category in output of a data mining process mining source code having at least one software bug of a category of bug and can provide the output of the data mining process to a machine learning process. The device can generate output of the machine learning process comprising probability of a category of bug and probable bug category for at least one source code statement of the source code. The device can infer team boundaries by correlating characteristics of source code with groups of developers. The device can receive bug category information for a bug from a bug tracker. The device can infer team boundaries comprising logical teams. The device can provide a visualization correlating bug category and a logical team.

Exemplary Operating Environment

Figure 11:
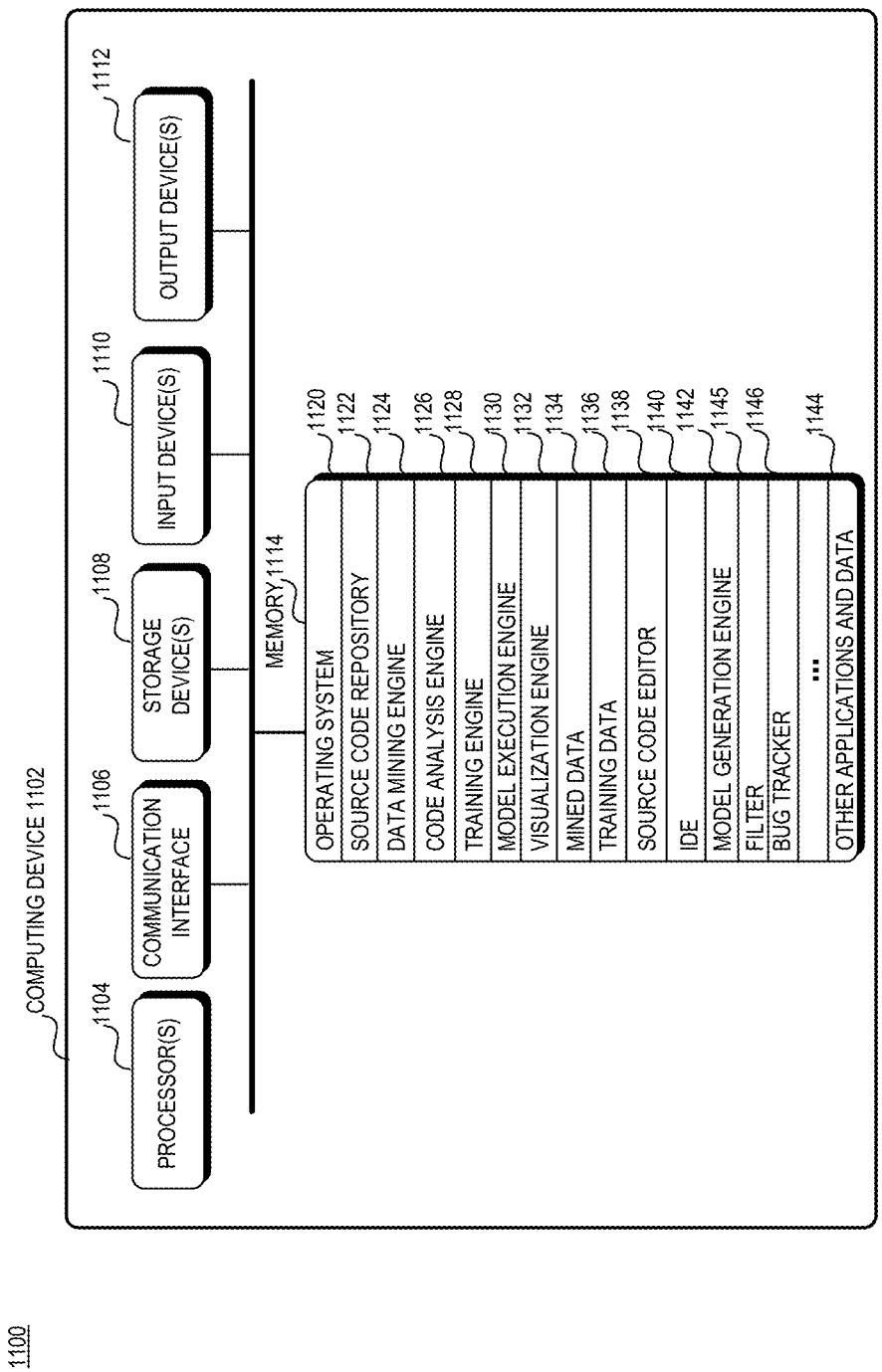
FIG. 11 is a block diagram illustrating an example of a computing or operating environment in accordance with aspects of the subject matter disclosed herein.

Attention now turns to FIG. 11 for a discussion of an exemplary operating environment. It should be noted that the operating environment 1100 is exemplary and is not intended to suggest any limitation as to the functionality of the embodiments. The embodiments may be applied to an operating environment 1100 utilizing at least one computing device 1102. The computing device 1102 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 1100 may be configured in a network environment, a distributed environment, a multi-processor environment, or a stand-alone computing device having access to remote or local storage devices.

The computing device 1102 may include one or more processors 1104, a communication interface 1106, one or more storage devices 1108, one or more input devices 1110, one or more output devices 1112, and a memory 1114. A processor 1104 may be any commercially available or customized processor and may include dual microprocessors and multi-processor architectures. The communication interface 1106 facilitates wired or wireless communications between the computing device 1102 and other devices. A storage device 1108 may be computer-readable medium that does not include propagating signals, such as modulated data signals transmitted through a carrier wave. Examples of a storage device 1108 include without limitation RAM, ROM, EEPROM, flash memory or other memory technology, CD-ROM, digital versatile disks (DVD), or other optical storage, magnetic cassettes, magnetic tape, magnetic disk storage, all of which do not include propagating signals, such as modulated data signals transmitted through a carrier wave. There may be multiple storage devices 1108 in the computing device 1102. The input devices 1110 may include a keyboard, mouse, pen, voice input device, touch input device, etc., and any combination thereof. The output devices 1112 may include a display, speakers, printers, etc., and any combination thereof.

The memory 1114 may be any computer-readable storage media that may store executable procedures, applications, and data. The computer-readable storage media does not pertain to propagated signals, such as modulated data signals transmitted through a carrier wave. It may be any type of memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 1114 may also include one or more external storage devices or remotely located storage devices that do not pertain to propagated signals, such as modulated data signals transmitted through a carrier wave.

The memory 1114 may include instructions, components, and data. A component is a software program that performs a specific function and is otherwise known as a module, program, application, and the like. The memory 1114 may include an operating system 1120, a source code repository 1122, a data mining engine 1124, a code analysis engine 1126, a training engine 1128, a model execution engine 1130, a visualization engine 1132, mined data 1134, training data 1136, a source code editor 138, an integrated development environment (IDE) 140, a model generation engine 142, a filter 1145, a bug tracker 1146 and other applications and data 1144.

The subject matter described herein may be implemented, at least in part, in hardware or software or in any combination thereof. Hardware may include, for example, analog, digital or mixed-signal circuitry, including discrete components, integrated circuits (ICs), or application-specific ICs (ASICs). Aspects may also be implemented, in whole or in part, in software or firmware, which may cooperate with hardware.

In addition, the logic flows depicted in the figures do not require the particular order shown, or sequential order. Other steps may be provided or steps may be eliminated, from the described flows, and other components may be added to, or removed from, the described systems and devices. Accordingly, other implementations are within the scope of the following claims.

In accordance with aspects of the subject matter described herein, a computer system can include one or more processors and a memory connected to one or more processors. At least one processor is configured to obtain a plurality of source code statements from at least one source code file. The file can include buggy data. The file can include bug-free data. The source code statements are transformed into a plurality of features with at least one feature representing the context of a software bug of a category or categories of interest and at least one feature representing a context not having a software bug of a category or categories of interest. These features are transformed into feature vectors that train a machine learning model to recognize patterns indicative of a software bug of a particular category or categories. The machine learning model is used to generate probabilities of a software bug of a category or categories for a target source code file. The feature vectors can be used to train a machine learning model to determine the likelihood that a category of bug is present in a target source code file. Information including but not limited to organizational boundaries can be inferred from the category of bugs present in a body of source code. The inferred organization boundaries can be used to generate team-specific machine learning models and/or analyses.

The system transforms the plurality of source code statements into a sequence of tokens, where each token is associated with a grammar of the source code file. The system may also transform the plurality of source code statements into features by converting and/or concatenating at least one element of the source code into a token along with the elements of the source code statement. The system may also transform the plurality of source code statements into features by converting each source code statement into a sequence of metrics wherein a metric is associated with a measurement of a syntactic element of source code statement. The machine learning model may be implemented as a LSTM model, RNN, or ANN.

The system visualizes the output of the machine learning model in various ways. The system may visualize one or more source code statement from a target source code file with a corresponding probability for one or more of the source code statements. The visualization may include highlighting a source code statement in accordance with its probability, altering a font size or text color in accordance with its probability, annotating a source code statement with a numeric probability value, and/or annotating a source code statement with an icon representing a probability value. The output of the visualization may be displayed when the probability exceeds a threshold value.

A device can include at least one processor and a memory connected to the at least one processor. The device including a data mining engine, a code analysis engine, a training engine, and a visualization engine. The data mining engine searches a source code repository for source code files. The code analysis engine converts a portion of a source code file having a software bug of a category or categories and a portion of a source code file not having a software bug of a category or categories into a sequence of syntactic elements that represent a context in which a software bug exists and fails to exist. The visualization engine generates a visualization identifying at least one portion of a target source code file having a likelihood of a software bug of a category or categories of interest. The visualization may include a portion of a target source code file and the probabilities associated therewith.

The training engine can use the sequence of syntactic elements to train a machine learning model to predict a likelihood of a software bug of a particular category or categories in a target source code file. The training engine can be trained to associate particular bug categories with groups of developers teams in an organization. Organizational boundaries can be inferred from the characteristics of source code. The inferred organization boundaries can be used to generate team-specific machine learning models and/or analyses. Inferred teams can be logical teams.

The training engine aggregates a contiguous set of sequences of syntactic elements into a window to generate a feature vector. The contiguous set of sequences includes an amount of sequences of syntactic elements preceding and following a select sequence. The portion of the source code file may include one or more lines of a source code file and/or classes of the source code file.

A method of using a system and device, such as the system and device described above, can include operations such as obtaining a plurality of source code files with and without software bugs. The source code files are mined from change records of a source code repository. Portions of the source code files are converted into a sequence of metrics, where a metric represents a measurement of a syntactic element. The metrics are used to train a machine learning model to predict the likelihood of a software bug in a portion of a target source code file. The portion of a target source code file may include a source code statement, a method and/or a class. The metrics may include one or more of a number of variables, a number of mathematical operations, a number of particular data type of elements referenced, a number of loop constructs, a usage of a particular method and a usage of a particular data type.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system, comprising:
a memory and at least one processor;
the at least one processor configured to:
use a machine learning system to infer logical or mathematical software bug categories associated with a plurality of source code statements from a plurality of source code files associated with a plurality of developers from a plurality of developer teams;
select, from the plurality of source code files, particular source code files that are associated with a particular developer team;
train a customized machine learning model for the particular developer team using the particular source code files associated with the particular developer team, the customized machine learning model being trained to learn a particular shared tendency of members of the particular developer team to produce particular bugs of a particular logical or mathematical software bug category;
analyze a target source code file having an occurrence of the particular logical or mathematical software bug category with the customized machine learning model to infer that a particular developer that produced the occurrence is a member of the particular developer team; and
output an indication that the particular developer belongs to the particular developer team.

2. The system of claim 1, the at least one processor further configured to:
filter out at least one bug category associated with at least one of the plurality of source code statements during a training phase of the machine learning system.

3. The system of claim 1, the customized machine learning model being trained to determine that the particular logical or mathematical software bug category is restricted to the particular developer team.

4. The system of claim 1, the at least one processor further configured to:
group bugs within the plurality of source code statements by logical or mathematical software bug category through unsupervised machine learning.

5. The system of claim 1, the at least one processor further configured to:
receive bug category information identifying the logical or mathematical software bug categories from a bug tracker; and
use the bug category information received from the bug tracker in a training phase of the machine learning system.

6. The system of claim 1, the at least one processor further configured to:
infer that the particular developer belongs to the particular developer team based at least on a relationship between the particular logical or mathematical software bug category and a particular method, function, or class utilized by the members of the particular developer team.

7. The system of claim 1, wherein the at least one processor is further configured to:
visualize a particular source code statement from the target source code file with a corresponding probability, output by the machine learning system, of the particular logical or mathematical software bug category for the particular source code statement.

8. The system of claim 1, wherein the at least one processor is further configured to:
visualize a particular source code statement from the target source code file with the particular logical or mathematical software bug category that is inferred by the machine learning system.

9. The system of claim 1, wherein the at least one processor is further configured to:
visualize a particular source code statement from the target source code file with an identification of the particular developer team.

10. A computer-implemented method, comprising:
using a machine learning system, inferring logical or mathematical software bug categories associated with a plurality of source code statements from a plurality of source code files associated with a plurality of developers from a plurality of developer teams;
selecting, from the plurality of source code files, particular source code files that are associated with a particular developer team;
training a customized machine learning model for the particular developer team usinq the particular source code files associated with the particular developer team, the customized machine learning model being trained to learn a particular shared tendency of members of the particular developer team to produce particular bugs of a particular logical or mathematical software bug category;
analyzing a target source code file having an occurrence of the particular logical or mathematical software bug category with the customized machine learning model to infer that a particular developer that produced the occurrence is a member of the particular developer team; and
outputting an indication that the particular developer belongs to the particular developer team.

11. The method of claim 10, further comprising:
filtering out at least one bug category associated with at least one of the plurality of source code statements during a training phase of the machine learning system.

12. The method of claim 10,
the customized machine learning model being trained to determine that the particular logical or mathematical software bug category is restricted to the particular developer team.

13. The method of claim 10, further comprising:
grouping bugs within the plurality of source code statements by logical or mathematical software bug category through unsupervised machine learning.

14. The method of claim 10, further comprising:
receiving bug category information identifying the logical or mathematical software bug categories from a bug tracker; and
usinq the bug category information received from the bug tracker in a traininq phase of the machine learning system.

15. The method of claim 10, further comprising:
inferring that the particular developer belongs to the particular developer team based at least on a relationship between the particular logical or mathematical software bug category and a particular method, function, or class utilized by the members of the particular developer team.

16. The method of claim 10, further comprising:
visualizing a particular source code statement from the target source code file with a corresponding probability, output by the machine learning system, of the particular logical or mathematical software bug category for the particular source code statement.

17. The method of claim 10, further comprising:
visualizing a particular source code statement from the target source code file with the particular logical or mathematical software bug category that is inferred by the machine learning system.

18. The method of claim 10, further comprising:
visualizing a particular source code statement from the target source code file with an identification of the particular developer team.

19. One or more computer-readable storage media storing instructions which, when executed by one or more processors, cause the one or more processors to perform acts comprising:
using a machine learning system, inferrinq logical or mathematical software bug categories associated with a plurality of source code statements from a plurality of source code files associated with a plurality of developers from a plurality of developer teams;

selecting, from the plurality of source code files, particular source code files that are associated with a particular developer team;

training a customized machine learning model for the particular developer team using the particular source code files associated with the particular developer team, the customized machine learning model beinq trained to learn a particular shared tendency of members of the particular developer team to produce particular bugs of a particular logical or mathematical software bug category;

analyzing a target source code file having an occurrence of the particular logical or mathematical software bug category with the customized machine learning model to infer that a particular developer that produced the occurrence is a member of the particular developer team; and outputting an indication that the particular developer belongs to the particular developer team.

20. The one or more computer-readable storage media of claim 19, the customized machine learning model being trained to determine that the particular logical or mathematical software bug category is primarily restricted to the particular developer team.

* * * * *